US007429417B2

(12) United States Patent
Kobayashi et al.

(10) Patent No.: US 7,429,417 B2
(45) Date of Patent: Sep. 30, 2008

(54) SHEET FOR FORMING PROCESS AND METHOD FOR MANUFACTURING THE SAME, IMAGE FORMING METHOD, METHOD FOR MANUFACTURING FORMING PROCESSED PRODUCT AND THE FORMING PROCESSED PRODUCT

(75) Inventors: Tomoo Kobayashi, Minamiashigara (JP); Tetsuro Kodera, Ashigarakami-gun (JP); Kunio Sakurai, Ashigarakami-gun (JP); Kaoru Torikoshi, Minamiashigara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 42 days.

(21) Appl. No.: 11/147,422

(22) Filed: Jun. 8, 2005

(65) Prior Publication Data

US 2006/0035065 A1 Feb. 16, 2006

(30) Foreign Application Priority Data

Aug. 16, 2004 (JP) ............................. 2004-236710

(51) Int. Cl.

| | |
|---|---|
| ***B32B 3/00*** | (2006.01) |
| ***B32B 5/16*** | (2006.01) |
| ***B32B 7/14*** | (2006.01) |
| ***B32B 37/00*** | (2006.01) |
| ***B32B 38/14*** | (2006.01) |
| ***G03G 13/20*** | (2006.01) |
| ***B29C 65/00*** | (2006.01) |

(52) U.S. Cl. .................... 428/204; 428/195.1; 428/412; 428/420; 430/124.53; 430/124.54; 156/277

(58) Field of Classification Search ............... 428/32.1, 428/195.1, 204, 412, 420; 430/124.53, 124.54; 156/277

See application file for complete search history.

(56) References Cited

U.S. PATENT DOCUMENTS

| | | | | |
|---|---|---|---|---|
| 4,965,166 | A * | 10/1990 | Hosoi et al. | 430/156 |
| 5,073,434 | A * | 12/1991 | Frank et al. | 428/195.1 |
| 5,395,677 | A * | 3/1995 | Harada et al. | 428/195.1 |
| 5,437,913 | A * | 8/1995 | Asaka et al. | 428/195.1 |
| 5,486,397 | A * | 1/1996 | Gordon et al. | 428/76 |
| 6,855,397 | B1 * | 2/2005 | Tateishi et al. | 428/195.1 |
| 7,205,046 | B2 * | 4/2007 | Kobayashi et al. | 428/343 |
| 2003/0224169 | A1 * | 12/2003 | Kobayashi et al. | 428/408 |

* cited by examiner

*Primary Examiner*—Milton I. Cano
*Assistant Examiner*—David J Joy
(74) *Attorney, Agent, or Firm*—Oliff & Berridge, PLC

(57) ABSTRACT

A sheet for forming process including a base material and at least one functional layer provided on a surface of the base material, wherein the functional layer has, at the outermost surface thereof, a surface resistivity of $1.0\times10^{8}$ to $1.0\times10^{13}$ Ω/□, and a surface of the base material, on which surface the functional layer is provided, contains at least one selected from polycarbonate resins and polyarylate resins; a method for manufacturing the sheet for forming process, an image forming method, a method for manufacturing a forming processed product using the sheet for forming process, and the forming processed product.

24 Claims, 1 Drawing Sheet

SHEET FOR FORMING PROCESS AND METHOD FOR MANUFACTURING THE SAME, IMAGE FORMING METHOD, METHOD FOR MANUFACTURING FORMING PROCESSED PRODUCT AND THE FORMING PROCESSED PRODUCT

CROSS-REFERENCE TO RELATED APPLICATION

This application claims priority under 35 USC 119 from Japanese Patent Application No. 2004-236710, the disclosure of which is incorporated by reference herein.

BACKGROUND OF THE INVENTION

1. Field of the Invention

The present invention relates to a sheet for forming process and a method for manufacturing the same, an image forming method, a method for manufacturing a forming processed product and the resulting forming processed product, and particularly to a sheet for forming process used suitably for manufacturing a three-dimensional article and the method for manufacturing the same, an image forming method, a method for manufacturing a forming processed product and the resulting forming processed product.

2. Description of the Related Art

Recently, a means for forming images of the same quality massively and inexpensively by a variety of printing methods such as hand gravure process, relief process, planography, gravure printing, and screen printing is known with developments of image forming technology. Such printing methods are widely used for face printing of image displaying articles (wallpapers, advertisement boards, clock boards, industrial goods such as switches, and dummy cans for automatic dispensers).

However, in the screen printing, for example, a number of printing plates corresponding to the number of images to be printed is required. In case color printing, the number of printing plates corresponding to those to be required for printing is necessary, resulting in a rather expensive cost. In some cases, printing plates once prepared are washed and stored, so that a wide space must be assured for the storage. Besides, even when there is a minor change in design, it is required that fresh printing plates are prepared and the previous matrices are replaced by the fresh ones. Therefore, such printing method as described above is unsuitable for limited production of a wide variety of goods.

On the contrary, an image formation (printing) according to an electrophotographic method is carried out by such a manner that a surface of an image carrying member is uniformly charged, exposed in response to image signals to form an electrostatic latent image due to a potential difference between exposed regions and unexposed regions, thereafter, color powders (image forming materials) called by the name of toners having a polarity reverse to (or the same as) that of the above-described charge are developed electrostatically, whereby a visual image (toner image) is formed on the surface of the image carrying member. In case of a color image, the color image is obtained by such a manner that either the above-described step is repeated plural times or a plurality of image forming devices are parallely arranged to form visual images, and these images are transferred to an image recording body, and fixed thereon (immobilization: solidification by melting and cooling color powders by means of essentially heat).

As mentioned above, according to an electrophotographic method, as long as there is electronic data, not only the same image can be formed repeatedly, but also it can easily be responded to a design modification or a different image, and such an image can be formed accordingly. Moreover, a toner image on the surface of an image carrying member can be substantially completely transferred to a surface of an image recording body, and even if the toner image remained slightly on the surface of the image carrying member, it can be easily removed by a resin blade, a brush and the like. Accordingly, printed materials can be easily prepared for limited production of a wide variety of goods.

The above-described toner is prepared usually by melt-mixing a hot-melt resin, a pigment, and an additive such as a charge control agent according to circumstances, and grinding and pulverizing the resulting melt-mixed product. A latent image in the electrophotographic method exhibits considerably high resolution as compared with the pulverized toner, and sufficient resolution can be expected in comparison with that of the screen printing, or that of an ink ribbon in a thermal transfer system.

With respect to a color image, four primary colors of cyan, magenta, yellow, and black are used in color toners, and when these toners are mixed, colors can be theoretically reproduced as in the case of printing. Besides, a toner resin can be incorporated comparatively freely with pigments in the toners, so that an image masking property by the toners can be increased easily.

The base material (core) which is most frequently used for a variety of dummy cans or the like at present is a polycarbonate sheet. The reason of which is in that polycarbonate sheet is excellent in printing characteristics and also in forming process suitability (convexoconcave processing). However, when such polycarbonate sheet applied to electrophotography without any modification, a toner being an image forming material cannot be sufficiently transferred thereto, and it results in poor image quality, because the sheet surface of polycarbonate is insulative.

Since a polycarbonate sheet is an insulative material, static electricity generates easily, so that there is a case where it scatters a toner image to deteriorate its image quality, or a case where it adsorbs dust. Besides, since a friction coefficient between sheets is too high, there is such a problem that sheets stick with each other, and it results in poor sheet conveyorability. As a result, sheets are conveyed in an overlapped state in an electronograph.

When it is intended in an electronograph to print out images on a resin sheet as used in forming process which softens comparatively at a low temperature, a surface tack appears in a fixing step, because a fixing temperature is higher than a softening temperature of a film, and thus, there is a problem of occurrence of enwinding jam in a fixing device. In addition, there is a case where image forming materials are offset in the fixing device.

Hence, it brings about troubles of a transfer of such image forming materials to a film surface, so that the equal resolution to that of thermal transfer system cannot be obtained.

An example of a plastic sheet which has been heretofore used for sheet forming technique includes rigid or flexible polyvinyl chloride (PVC) sheets, polypropylene (PP) sheets, polystyrene (PS) sheets, ABS sheets, and polycarbonate (PC) sheets.

Among others, an inexpensive rigid PVC sheet having excellent transparency has been generalized, however, an amorphous polyethylene terephthalate (A-PET) sheet which does not contain any chlorine atom, thus it is excellent in non-toxicity, transparency, and surface gross, has been recently watched as a thermoformable sheet. Such highly transparent A-PET sheet is obtained by cooling quickly and forcibly polyethylene terephthalate to be an amorphous state by means of cooling rolls at the time of extruding a sheet. The A-PET sheet is excellent in thermoforming and transparent, so that a fair container can be formed. However, crystallization begins to proceed at a sheet temperature of from around 100° C. onward in case of formation, at the same time; there is a defect of whitening.

SUMMARY OF THE INVENTION

The present invention provides an inexpensive sheet for forming process and a method for manufacturing the same. In the sheet for forming process of the invention, an image of high resolution can be directly formed thereon by the use of a conventional electronograph as it is without accompanying any considerable modification, and a high quality image having heat-resistance and light-resistance sufficient for even an outdoor application can be formed visually recognizable. Moreover, the present invention provides a method for forming an image on the sheet for forming process, a method for manufacturing a forming processed product by using the sheet for forming process, and the resulting forming processed product.

As a result of eager studies by the present inventors, it has been found that when a surface resistivity at the outermost surface of a functional layer provided on a surface of a base material is controlled and a material is selected for the base surface, the above-described objects can be achieved. Furthermore, the inventors studied also a method for forming a reflected image in such that when an image is visually recognized from the side opposite to that on which the image is formed through the base material, the image is recognized as a normally turned image (normal image).

Moreover, a functional layer having a variety of functions is formed on the side opposite to that the image is formed through the base material, whereby a variety of processing operations can be applied on a surface of a sheet. For instance, when the functional layer contains a filler, it results in decrease in a coefficient of friction between films, so that traveling performance of a film can be elevated. Besides, when an ultraviolet absorber and an antioxidant are added to the functional layer, resistance to light in a sheet may be improved. As an environmental protection measure, a base material structured from a non-chlorine-based resin and an image fixing method suitable for the resin is adopted.

The invention comprises the following constitutions.

(1) A sheet for forming process includes a base material; and at least one layer of a functional layer provided on a surface of the base material; wherein the functional layer has, at the outermost surface thereof, a surface resistivity of $1.0\times10^{8}$ to $1.0\times10^{13}$ Ω/□, and a surface of the base material, on which surface the functional layer is provided, contains at least one selected from polycarbonate resins and polyarylate resins.

(2) A method for manufacturing a sheet for forming process including a base material and at least one functional layer provided on a surface of the base material, the functional layer having, at the outermost surface thereof, a surface resistivity of $1.0\times10^{8}$ to $1.0\times10^{13}$ Ω/□, and a surface of the base material, on which surface the functional layer is provided, containing at least one selected from polycarbonate resins and polyarylate resins, the method including forming the functional layer on the surface of the base material by using a coating solution; wherein a solvent used for the coating solution is a good solvent for at least one selected from polycarbonate resins and polyarylate resins; and the functional layer is formed while dissolving the surface of the base material.

(3) A method for forming an image includes forming a toner image by means of an electrophotographic method on a surface of a functional layer in a sheet for forming process including a base material and at least one functional layer provided on a surface of the base material, wherein the functional layer has, at the outermost surface thereof, a surface resistivity of $1.0\times10^{8}$ to $1.0\times10^{13}$ Ω/□, and a surface of the base material, on which surface the functional layer is provided, contains at least one selected from polycarbonate resins and polyarylate resins.

(4) A method for manufacturing a forming processed product includes forming a toner image by means of electrophotographic method on a surface of a functional layer in a sheet for forming process including a base material and at least one functional layer provided on a surface of the base material, the functional layer having, at the outermost surface thereof, a surface resistivity of $1.0\times10^{8}$ to $1.0\times10^{13}$ Ω/□, and a surface of the base material, on which surface the functional layer is provided, containing at least one selected from polycarbonate resins and polyarylate resins; providing a protection layer on the sheet for forming process so as to cover the toner image; and processing the sheet for forming process on which the protection layer is provided.

(5) A forming processed product includes a sheet for forming process including a base material and at least one functional layer provided on a surface of the base material, the functional layer having, at the outermost surface thereof, a surface resistivity of $1.0\times10^{8}$ to $1.0\times10^{13}$ Ω/□, a surface of the base material, on which surface the functional layer is provided, containing at least one selected from polycarbonate resins and polyarylate resins; and a toner image being formed by means of an electrophotographic method on a surface of the functional layer; and the protection layer for covering the toner image.

BRIEF DESCRIPTION OF THE DRAWING

Preferred embodiment of the present invention will be described in detail based on the following FIGURE, wherein.

DETAILED DESCRIPTION OF THE INVENTION

Figure 1:
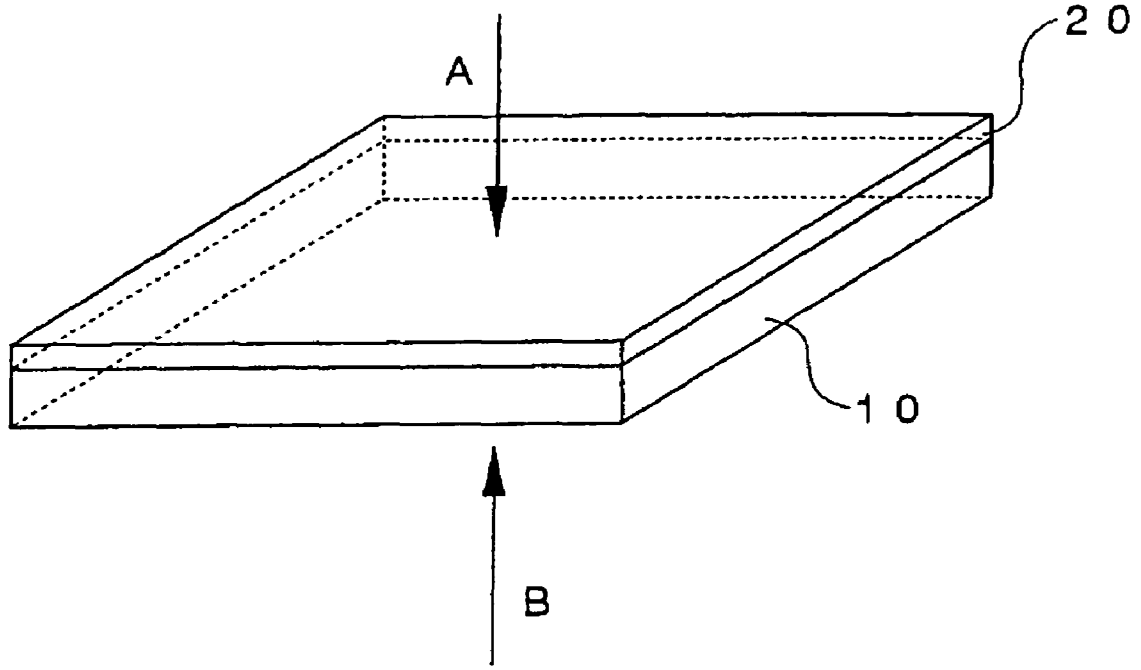
FIG. 1 is a schematic perspective view showing an example of a sheet for forming process according to the invention.

In the following, a sheet for forming process according to the present invention, a method for manufacturing the same, an image forming method, a method for manufacturing a forming processed product, and the resulting forming processed product will be described in detail.

<Sheet for Forming Process>

A sheet for forming process of the invention has a base material and at least one functional layer provided on a surface of the base material, wherein a surface resistivity of the outermost surface of the functional layer is $1.0\times10^{8}$ to $1.0\times10^{13}$ Ω/□, and a surface of the base material, on which surface the functional layer is provided, contains at least one selected from polycarbonate resin and polyarylate resin.

The base material of a sheet for forming process of the invention is not specifically limited, so far as the surface of the base material, on which surface the functional layer is provided, contains at least one selected from polycarbonate resins and polyarylate resins. Furthermore, it is preferred that the whole base material or the whole surface of the base material is made of at least one selected from polycarbonate resins and polyarylate resins.

The sheet for forming process of the invention contains at least one selected from polycarbonate resins and polyarylate resins on a surface of the base material, on which surface the functional layer is provided, so that a resin or the like, contained in a coating solution which is to be applied on the surface of the base material to form the functional layer in the preparation of the sheet for forming process of the invention, can be mutually dissolved with the at least one selected from polycarbonate resin and polyarylate resin. Thus, the surface of the base material is bonded firmly to the functional layer which is provided in contact with the surface of the base material, whereby exfoliation can be prevented. Even if it is exfoliated, it is not clearly exfoliated in an interfacial region.

Furthermore, polycarbonate resin and polyarylate resin have such merits that they are not only excellent in compatibility of a coating solution, but also they are easily available among the resins applicable for the base material and material costs are inexpensive, and that the sheet for forming process and the forming processed products are easily manufactured by employing existing equipment.

Polycarbonate is a polycondensate obtained from bisphenols and a carbonic acid, while polyarylate is a polyester obtained by polycondensation of a bisphenol and an aromatic dicarboxylic acid. Since polyarylate contains rigid aromatic rings in the main chain at a high density, its heat resistance is generally higher than that of polycarbonate.

An example of the bisphenols includes bisphenol A (2,2-bis(4-hydroxyphenyl)propane), bisphenol C (4,4'-(1-methylethylidene)bis(2-methylphenol)), bisphenol AP (4,4'-(1-phenylethylidene)bisphenol), bisphenol Z (4,4'-cyclohexylidene bisphenol), 4,4'-cyclohexylidene bis(3-methylphenol), 5,5'-(1-methylethylidene)(1,1'-biphenyl)-2-ol, (1,1'-biphenyl)-4,4'-diol, 3,3'-dimethyl(1,1'-biphenyl)-4,4'-diol, 4,4'-(1,4-phenylene bis (1-methylethylidene) bisphenol), 4,4'-(1,4-phenylene bis (1-methylethylidene) bis (2-methylphenol)), 4,4'-(1,3-phenylene bis (1-methylethylidene) bis (2-methylphenol)) and bisphenol S (4,4'-bis(dihydroxy diphenyl sulfone). Among others, materials of bisphenol A type are usually employed. They may be used alone or in combination of two or more of them.

An example of aromatic dicarboxylic acids includes terephthalic acid, isophthalic acid, oxalic acid, malonic acid, succinic acid, adipic acid, itaconic acid, azelaic acid, sebacic acid, eicosanoic diacid, naphthalene dicarboxylic acid, diphenic acid, dodecanoic diacid, and cyclohexane dicarboxylic acid. These materials are not necessarily used alone, but two or more of them may be copolymerized. Among others, a preferred example is a mixture of a terephthalic acid component and/or an isophthalic acid component. The polyarylates obtained from the mixture are preferred in view of melt processability and comprehensive performance. In case of such mixture, although a mixing ratio may be arbitrarily selected, terephthalic acid component/isophthalic acid component=9/1 to 1/9 (molar ratio) is preferable, particularly 7/3 to 3/7 (molar ratio) is preferred in view of a balance between melt processability and performance, and more preferable is 1/1 (molar ratio).

The above-mentioned sheet for forming process according to the invention will be described hereunder.

In the sheet for forming process of the invention, it is required that a surface resistivity in the outermost surface of a functional layer provided on a surface of a base material is within a range of from $1.0\times10^{8}$ to $1.0\times10^{13}$ Ω/□, and preferably within a range of $1.0\times10^{9}$ to $1.0\times10^{11}$ Ω/□.

When the surface resistivity is less than $1.0\times10^{8}$ Ω/□, an ohmic value of a sheet for forming process used as an image recording material becomes too low at a high temperature and a high humidity, so that there is a case, for example, a toner transferred from a transfer member gets out of order. On the other hand, when a surface resistivity exceeds $1.0\times10^{13}$ Ω/□, an ohmic value of a sheet for forming process used as an image recording material becomes too high, and there is a case, for example, a toner transferred from a transfer member cannot allow to transit to a film surface, resulting in an image defects due to inferior transfer.

Furthermore, when a functional layer is provided on only either surface of a base material, it is preferred that a surface resistivity of a surface of the base material, on which surface the functional layer is not provided, is within a range of from $1.0\times10^{8}$ to $1.0\times10^{13}$ Ω/□, and more preferable is within a range of $1.0\times10^{9}$ to $1.0\times10^{11}$ Ω/□.

The surface resistivity may be measured by using a circular electrode (for example, "HR probe" of trade name: HIRESTA-IP manufactured by Mitsubishi Oil Chemicals Ltd.) in accordance with JIS K 6911 (Japanese Industrial Standards K 6911) under the atmosphere of 23° C. and 55% RH.

In the sheet for forming process, when either surface has only a surface resistivity within the above-described range, it is preferred that an image is formed on the surface having such surface resistivity.

To control a surface resistivity of the outermost layer of a functional layer provided on the surface of the base material, or that of the surface of the base material is held within a range of from $1.0\times10^{8}$ to $1.0\times10^{13}$ Ω/□, there are many ways as described hereinafter. For instance, a high-molecular electro-conductive agent, a surfactant, electro-conductive metal oxide particles and the like are added into a functional layer.

In case of manufacturing a film to be used as a base material, a surfactant, a high-molecular electro-conductive agent or electro-conductive fine particles and the like are added to a resin. The surface of the film is coated with a surfactant, or the surface thereof is metallized to form a metallic thin film. A suitable amount of a surfactant and the like may be added to an adhesive and the like to be applied to the film.

An example of applicable surfactants includes, for example, cationic surfactants such as polyamines, ammonium salts, sulfonium salts, phosphonium salts, betaine amphoteric salts and the like; anionic surfactants such as alkyl phosphates and the like; and nonionic surfactants such as fatty esters and the like. Among others, cationic surfactants having remarkable mutual actions with a negative charge type toner for a current electrophotographic application are effective for improvement of transferability.

Quaternary ammonium salts are preferred among cationic surfactants. A preferred example of the quaternary ammonium salts is a compound represented by the following general formula (I):

(I)

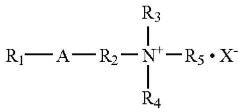

wherein $R_1$ is an alkyl group, an alkenyl group, and an alkynyl group having 6 to up to 22 carbon atoms, $R_2$ is an alkyl group, an alkenyl group, and an alkynyl group having 1 to up to 6 carbon atoms; $R_3$, $R_4$, and $R_5$ may be the same as those mentioned or different from one another, and they are an aliphatic group, an aromatic group, and a heterocyclic group, respectively, wherein the aliphatic group means a straight-chain, branched chain or cyclic alkyl group, alkenyl group, and alkynyl group; on one hand, the aromatic group means a benzene monocyclic, or condensed polycyclic aryl group wherein these groups may contain a substituent such as a hydroxyl group; A is an amide linkage, ether linkage, an ester linkage, or a phenyl group which may not exist; and $X^-$ is a halogen element, sulfuric acid ion, or nitric acid ion, and these ions may contain a substituent.

A constitution of a sheet for forming process according to the invention is not specifically limited so far as at least one layer of a functional layer is provided on the surface of the base material. In the following, the sheet for forming process of the invention will be described in detail by referring to the accompanying drawing. It is, however, to be noted that the constitution of the sheet for forming process of the invention is not limited to the one illustrated in the following figure.

FIG. 1 is a schematic perspective view showing an example of the sheet for forming process according to the invention wherein the sheet for forming process of the invention shown in FIG. 1 is composed of a base material 10 and a functional layer 20 provided on a surface of the base metal 10. Furthermore, if required, an image reception layer may be provided on a side of the base material 10 on which the functional layer 20 is not formed.

In FIG. 1, although the functional layer 20 is illustrated in the form wherein the functional layer 20 has a layer structure (coating layer), the functional layer is not limited to the form illustrated in the figure, but such functional layer 20 may be provided directly on a surface of the base material 10 by processing mechanically the surface of the base material 10. However, another functional layer is to be separately provided on the surface of the base material 10 in the case when the former functional layer 20 is formed by processing mechanically the surface of the base material 10 in the invention.

The sheet for forming process of the invention has such a structure that, for example, a reverse image (reflected image) is formed on a surface of a transparent base material 10 in such that when the reverse image is visually checked from the side opposite to that on which the image is formed through the base material 10, the target image is observed as a normally turned image (normal image), and further, a functional layer 20 is provided on the side on which the reverse image is not formed. In other words, as shown in FIG. 1, the image is formed from the side indicated by the arrow B, while a glossiness control means (the functional layer 20) is provided on a surface indicated by the arrow A. According to the sheet for forming process as constituted above, since a surface of the base material on which an image is formed differs from that on which the glossiness control means is formed, a variety of functions can be controlled at the same time without affecting adversely a quality of the image formed.

A base material 10 applicable to the sheet for forming process of the invention is preferably transparent wherein the term "transparent" means, for example, a light in visible region transmits the sheet at a certain degree. More specifically, the transparency is sufficient in a degree where the image formed can be at least visually observed from the side opposite to that on which the image is formed through the base material 10 in the invention.

In the case where a surface of the base material 10 contains at least one selected from polycarbonate resins and polyarylate resins as in the sheet for forming process of the invention, a base material 10 may be composed of a polycarbonate sheet and/or a polyarylate sheet and in addition, a plastic film as enumerated below, if the base material 10 has a structure composed of two or more layers.

An example of such plastic sheets as mentioned above includes films having optical transparency which can be used as an OHP film such as a polyester film, a polyacetate film, a triacetate cellulose film, a nylon film, a polysulfone film, a polystyrene film, a polyphenylene sulfide film, a polyphenylene ether film, a cycloolefin film, a polypropylene film, a polyimide film, cellophane, and an ABS (acrylonitrile-butadiene-styrene) resin film.

Among polyester films, preferably used are particularly the one wherein around half of an ethylene glycol component of PET (polyethylene terephthalate) is replaced by a 1,4-cyclohexane methanol component called PET-G, the one alloyed by mixing polycarbonate with the PET, besides amorphous polyester which is a PET being not biaxially oriented and called A-PET and the like.

Concerning the plastic film materials as enumerated above, when application of a base material containing no chlorine is taken into consideration, examples of further preferably applicable films include film adducts of the polystyrene-based resin films, ABS resin films, AS (acrylonitrile-styrene) resin films, PET films, and films of polyolefin-based resins such as polyethylene and polypropylene, with a hot melt-base adhesive such as polyester or EVA.

Because of the base material 10 made of a nonchlorine-base resin, generation of dioxin due to combustion of sheet for forming process and the like can be suppressed.

In the invention, it is preferred that a base material is composed of at least two layers wherein at least one layer of the base material contains a polyester resin (PET-G) prepared by at least copolymerizing ethylene glycol, terephthalic acid, and 1,4-cyclohexane dimethanol with each other. Since the PET-G itself has heat sealability, the PET-G is excellent in adhesion to a film on which an image is held, after lamination therewith. Accordingly, when an image is inserted in between the film and a core base material sheet, or when a hologram printed matter is sandwiched between them, it becomes difficult to tamper with an image, so that a product excellent in security can be achieved.

Other than the plastic films as mentioned already, there are the other transparent resins, and transparent ceramics as a material used in combination with a polycarbonate film and/or a polyarylate film. These resins and ceramics may be colored with pigments or dyes. On one hand, the base material 10 may be in the form of a film or a plate, and further may have a shape with a certain thickness without flexibility, or with ensuring a certain degree of strength required for the base material 10.

Preferred is that the functional layer 20 has at least one function selected from those for controlling glossiness, resistance to light, antimicrobial activity, flame retardancy, releasability, and chargeability. Specifically, the functional layer 20 is provided for adding and/or elevating a variety of functions such as glossiness, resistance to light, antimicrobial activity, flame retardancy, releasability, electroconductivity, and more preferably moisture resistance, heat resistance, water repellency, wear resistance, and scratch resistance with respect to a surface of the base material 10. Thus, a sheet for forming process provided with the functional layer 20 may have resistance to a variety of use conditions.

It is preferred that at least one selected from a charge control agent, an antimicrobial agent, an ultraviolet absorber, and an antioxidant is allowed to contain in the functional layer 20. The charge control agent has an effect for preventing adsorption of a foreign matter due to electricity and the like at the time of processing a sheet (assurance of yield). The antimicrobial agent has an effect for keeping the resulting processed product clean. The ultraviolet absorber and the antioxidant have an effect for preventing deterioration of a color material (color degradation) and the like under ultraviolet ray or in the atmosphere.

In the following, particularly, an example of the functional layer 20 will be described with respect to control for glossiness. It is to be noted, however, that the invention is not limited thereto.

The glossiness is controlled in such that "dazzling" of an image formed on the surface of the base material 10 is suppressed, and visual recognition is elevated even when the image is viewed from any direction. A functional layer 20 for controlling glossiness may be provided either, for example, to constitute a glossiness control layer on a surface of the base material 10 as shown in FIG. 1, or a surface of the base material 10 may be mechanically processed by which glossiness is directly controlled so as to give a glossiness control function to the base material 10.

A manner for applying a mechanical processing by which glossiness is directly controlled onto a surface of the base material 10 includes a method for forming irregularities on the surface of the base material 10 by the use of a mechanical means. When irregularities having a depth of around 3 to 30 μm are formed on the surface of the base material 10, light scattering appears on the surface of the base material. Accordingly, desirable glossiness treatment can be realized by changing a size, roughness, a depth and the like of the irregularities. An example of the applicable mechanical means includes a sandblast method, an embossing method, a plasma etching method, and the other well-known mechanical processing methods.

The sandblast method is a manner for a surface of a material is made to be coarse by continuously dashing down abrasive grains of infinite or definite particles made of organic resins, ceramics, metals and the like. In the embossing method, a pattern wherein irregularities are provided has been previously fabricated, and a material is allowed to be in contact with the pattern, whereby the irregularities on the pattern are transferred to a surface of the material. The plasma etching method is a manner for utilizing excited molecules, radicals, ions and the like generated as a result of molecular dissociation due to plasma arc to effect etching. The etching proceeds by means of evaporation of volatile compounds produced by the reaction of producing excited species and a material applied.

In the case where the functional layer 20 controlling glossiness is constituted as a glossiness control layer, the glossiness control layer may be formed by the application of a phase separation of polymers wherein a resin without having a compatibility with another resin forming the glossiness control layer is added to the latter resin, phases of these resins are separated during drying them after layers are formed, whereby irregularities are produced on a surface of the glossiness control layer. In this case, when a type, an amount of addition, a drying condition and the like of a resin without having compatibility with the resin forming a glossiness control layer is controlled, a condition of such phase separation can be varied, whereby a state of irregularities may be controlled, and thus, glossiness of the surface of the control layer can be also controlled.

Moreover, in case of constituting the functional layer 20 as a glossiness control layer, the glossiness control layer may be containing at least a binder and a filler. The binder to be contained in the glossiness control layer may be a resin. It is preferred that the resin is selected from hot-melt resins used in an image forming material (toner) in view of affinity with respect to a base material, variety in selection of materials, stability, cost, easiness in fabrication steps and the like. A film thickness is preferably within a range of from 0.01 to 20 μm for stability in film formation, and more preferable is within a range of from 0.1 to 5 μm for containing stably a filler and ensuring adhesivity with respect to a base material.

Hot-melt resins used for a functional layer having at least one function selected from those for controlling glossiness, resistance to light, antimicrobial activity, flame retardancy, releasability, and chargeability or another functional layer functioning as an image reception layer which will be described later may be utilized without accompanying any particular limitation so far as the hot-melt resins are used for image forming materials. An example of such hot-melt resins includes a homopolymer or copolymer obtained by polymerizing one or two or more of styrenes such as styrene, vinylstyrene, and chlorostyrene; monoolefins such as ethylene, propylene, butylene, and isobutylene; vinyl esters such as vinyl acetate, vinyl propionate, vinyl benzoate, and vinyl butyrate; esters of α-unsaturated aliphatic monocarboxylic acid such as methyl acrylate, ethyl acrylate, butyl acrylate, dodecyl acrylate, octyl acrylate, phenyl acrylate, methyl methacrylate, ethyl methacrylate, butyl methacrylate, and dodecyl methacrylate; vinyl ethers such as vinyl methyl ether, vinyl ethyl ether, and vinyl butyl ether; vinyl ketones such as vinyl methyl ketone, vinyl hexyl ketone, and vinyl isopropenyl ketone; and diene-base monomers such as isoprene, and 2-chlorobutadiene.

Among others, particularly, styrenes, esters of α-unsaturated aliphatic monocarboxylic acid and the like are preferably used.

Furthermore, polyester, polyurethane resins and the like may be used alone or in combination thereof as thermoplastic resins applicable for the invention.

The polyesters may be manufactured through reactions of a polyvalent hydroxy compound and a polybasic carboxylic acid, or the reactive acid derivative thereof. An example of the polyvalent hydroxy compounds constituting the polyesters includes diols such as ethylene glycol, diethylene glycol, triethylene glycol, 1,2-propylene glycol, 1,3-propylene glycol, neopentyl glycol, and 1,4-butanediol; bisphenol A alkylene oxide adducts such as hydrogenated bisphenol A, polyoxyethylenated bisphenol A, and polyoxypropylenated bisphenol A; the other divalent alcohols and divalent phenols such as bisphenol A.

Moreover, an example of the polybasic carboxylic acids includes malonic acid, succinic acid, adipic acid, sebacic acid, alkylsuccinic acids, maleic acid, fumaric acid, mesaconic acid, citraconic acid, itaconic acid, glutaconic acid, cyclohexanedicarboxylic acid, phthalic acid, (isophthalic acid, terephthalic acid), the other divalent carboxylic acids, or the acid anhydrides thereof, and reactive acid derivatives such as alkyl esters and acid halides. In addition to these divalent hydroxy compounds and carboxylic acids, a tri- or polyvalent hydroxyl compound and/or a tri- or polyvalent polybasic carboxylic acid may be added in order to non-linearlize the resulting thermoplastic resin at a degree in which a tetrahydrofuran insoluble matter does not produce.

Among others, particularly desirable is a linear saturated polyester resin obtained through a polycondensation of phthalic acid as a divalent carboxylic acid and ethylene glycol and neopentyl glycol as polyvalent hydroxy compounds at a predetermined composition ratio. With respect to the composition ratio, desirable is a polymer obtained by polymerization of about 1:1 mixture of the undermentioned divalent carboxylic acids and the undermentioned polyvalent hydroxy compounds wherein a molar ratio of terephthalic acid and isophthalic acid is around 1:1, while a molar ratio of ethylene glycol and neopentyl glycol is within a range of 7:3 to 1:9.

Besides, a resin constituting a glossiness control layer may be a setting resin such as thermosetting resins, photocuring resins, and electron beam curing resins in order to increase its film strength.

Resins known usually as those cured (insolubilized) by heating are applicable to the thermosetting resins, and an example thereof includes phenol-formaldehyde resins, urea-formaldehyde resins, melamine-formaldehyde resins, resins prepared by curing an acrylic polyol with isocyanate, resins prepared by curing a polyester polyol with melamine, and resins prepared by curing acrylic acid with melamine. Furthermore, a monomer being a constitutional component of thermosetting resins may be used in combination.

Other than that mentioned above, even if a thermoplastic resin may be used as a thermosetting resin in the invention, so far as the thermoplastic resin is cured by crosslinkage to have a heat resistance. As an example of such thermosetting resin, a thermosetting acrylic resin is preferably used. The thermosetting acrylic resin is obtained by crosslinking a copolymer prepared by polymerizing at least one acrylic monomer, or an acrylic monomer and a styrene monomer with a melamine compound or an isocyanate compound.

An example of the acrylic monomers includes alkyl methacrylates such as methyl methacrylate, butyl methacrylate, octyl methacrylate, and stearyl methacrylate; alkyl acrylates such as ethyl acrylate, propyl acrylate, butyl acrylate, and octyl acrylate; amino group-containing vinyl monomers such as acrylonitrile, acrylamide, dimethylaminoethyl methacrylate, diethylaminoethyl methacrylate, dimethylaminoethyl acrylate, and dimethylaminopropyl methacrylamide, while an example of the styrene monomers includes styrene, α-methylstyrene, vinyltoluene, and p-ethylstyrene.

Although curing or setting is not limited to thermosetting, curable silicone resins may be preferably used. In general, silicone resins are classified into a silicone resin having a straight-chain structure being a material of silicone oils, silicone rubbers and the like, and another silicone resin having a three-dimensionally crosslinked structure on the basis of their molecular structures. Moreover, various properties such as releasability, adhesiveness, heat resistance, insulation characteristics, and chemical stability in a silicone resin is decided based on molecules (organic molecules) bonded to silicon atom, a degree of polymerization, and the like. A curable silicone resin applicable to the invention is the silicone resin having a three-dimensionally crosslinked structure. The silicone resin of the three-dimensionally crosslinked structure is usually polymerized from polyfunctional (trifunctional, tetrafunctional) units, and the resulting silicone resin has a crosslinked structure.

An example of the silicone resin having a straight-chain structure includes silicone oils having a low molecular weight and being utilized as an insulating oil, a liquid coupling, a buffer oil, a lubricating oil, a heat transfer medium, a water repellent, a surface treatment, a releasing agent, an anti-foaming agent and the like; and silicone rubbers prepared by adding a vulcanizing agent or the like to a silicone monomer, and then heat-hardening the mixture to obtain a polymer having a molecular weight (siloxane unit) of around 5000 to 10000. However, these silicone resins are not suitable for the curable silicone resin.

The curable silicone resins are classified into a silicone varnish soluble in an organic solvent and having a comparatively low molecular weight, and a silicone resin of a high polymerization degree on the basis of a molecular weight unit. Furthermore, the curable silicone resin is classified into a condensation type, addition type, and radiation type (ultraviolet curing type, electron radiation curing type) based on a curing reaction in a producing stage. Moreover, the silicone resins are classified into a solvent type and a solventless type silicon resins according to a coating pattern.

A factor for dominating the curing reaction includes a type of reactive groups, the number of reactive groups, a curing time, temperature, irradiation energy and the like. An example of a manner for controlling the curing reaction includes a manner for adding monofunctional or bifunctional polydimethyl siloxane, or a reaction inhibitor (acetylene alcohols, cyclic methylvinylcyclo siloxane, siloxane-modified acetylene alcohols and the like); and a manner for adjusting an amount of catalysts, a reaction temperature, a reaction time, UV irradiation intensity and the like. When a curing reaction is controlled as mentioned above, a molecular weight of a curable silicone resin, or silanol remaining amount as a reactive group can be adjusted. Thus, it becomes possible to control freely releasability, hardness, adhesiveness, surface hardness, transparency, heat resistance, chemical stability and the like of the silicone resin.

In a stage for curing the curable silicone resin, strong bonds are formed between the base material 10 and the curable silicone resin. Accordingly, the glossiness control layer to be formed on a surface of the base material 10 exhibits an excellent adhesive strength with respect to the base material 10, so that there is no exfoliation from the base material 10.

An example of a composition containing, the photocurable resin is such composition containing, as the major constituents, a compound having a reactive double bond in a vinyl group and the like in the molecule (including not only a low molecular-weight compound, but also a high molecular-weight compound), an initiator required for photocuring, a substrate (a colored layer, optionally a base material layer) protection material such as an ultraviolet absorber, and a high-molecular material such as a resin for improving sheet maintenance according to necessity.

An example of a composition containing the electron beam curable resin is such composition containing, as the major constituents, a compound having a reactive double bond such as a vinyl group and the like, a substrate protection material (an ultraviolet absorber), and a resin according to necessity.

An example of a compound having a reactive double bond in the molecule includes monofunctional type compounds each having (meth)acryloyl group such as methyl meth(acrylate), ethyl (meth)acrylate, benzyl (meth)acrylate, 2-ethoxyethyl (meth)acrylate, and phenoxydiethylene glycol (meth) acrylate; polyfunctional type compounds such as 1,6-hexanedioldi(meth)acrylate, neopentyl glycol di(meth) acrylate, polyethylene glycol di(meth)acrylate, polypropylene glycol di(meth)acrylate, trimethylpropane tri (meth)acrylate, pentaerythritol tri(meth)acrylate, pentaerythritol tetra(meth)acrylate, and dipentaerythritol hexa(meth) acrylate; oligomers such as polyester acrylate, polyurethane acrylate, polyepoxy acrylate, polyether acrylate, oligoacrylate, polyalkyd acrylate, and polyol acrylate; and those containing a vinyl group or an allyl group such as styrene monomers, α-methylstyrene, divinylbenzene, vinyl acetate, pentene, hexene, and unsaturated compounds.

Into these compounds, a polar group such as a hydroxyl group, an amino group, a carboxyl group, a carbonyl group, an epoxy group and the like may be introduced for the sake of improving adhesion in a glossiness control layer, or a compatibility with a substrate protection material.

A photocuring polymerization initiator is added particularly to cure a resin by means of ultraviolet rays.

The photocuring polymerization initiator is usually called by the name of photoinitiator, and for example, benzoin alkylether-base, acetophenone-base, benzophenone-base, thioxanthone-base, and the like photoinitiators are preferably used. An example of the benzoin ether-base photoinitiators includes benzyl, benzoin, benzoin methyl ether, benzoin ethyl ether, and benzoin propyl ether. An example of the acetophenone-base photoinitiators includes 2,2'-diethoxy acetophenone, 2-hydroxy-2-methylpropiophenone, p-tert-butyltrichloro acetophenone, and 2,4,6-trimethylbenzoyl diphenylphosphine oxide. An example of the benzophenone-base photoinitiators includes benzophenone, 4-chlorobenzophenone, 4,4'-dichlorobenzophenone, 3,3'-dimethyl-4-methoxybenzophenone, and dibenzosuberenone. An example of thioxanthone-base photoinitiators includes thioxanthone, 2-chlorothioxathone, 2-methylthioxanthone, 2-isopropylthioxanthone, and 2-ethylanthoraquinone.

The photoinitiator is added to 100 parts by weight of the compound containing a reactive double bond in an amount within a range of from 0.05 to 10 parts by weight, and preferably a range of from 0.1 to 5 parts by weight. Furthermore, the photoinitiators are not necessarily used alone, but they may be used in combination of two or more of them.

As a material for the substrate protection, particularly a light-resisting material, commercially available ultraviolet absorbers and the like may be used. A material to be added is selected from that which has good dispersion stability in a composition, and which is not denatured by irradiation of light. An example of organic-base materials includes salicylic acid-base materials such as phenyl salicylate, p-tert-butylphenyl salicylate, and p-octylphenyl salicylate; benzophenone-base materials such as 2,4-dihydroxybenzophenone, 2-hydroxy-4-methoxybenzophenone, 2-hydroxy-4-octyloxybenzophenone, and 2-hydroxy-4-dodecyloxybenzophenone; benzotriazole-base materials such as 2-(2'-hydroxy-5'-methylphenyl)$_2$H-benzotriazole, 2-(2'-hydroxy-5'-tert-butylphenyl)benzotriazole, and 2-(2'-hydroxy-3'-tert-butyl-5'-methylphenyl)-5-chlorobenzotriazole; and cyano acrylate-base materials such as 2-ethylhexyl-2-cyano-3,3'-diphenyl acrylate, and ethyl-2-cyano-3,3'diphenyl acrylate.

Furthermore, an example of inorganic-base materials includes oxide fine particles such as zinc oxide, and titanium oxide, and in addition, metal oxide fine particles such as iron oxide, and cerium oxide.

For the ultraviolet absorbers, the organic-base materials are particularly preferable, and such organic-base ultraviolet absorber is added to 100 parts by weight of the compound containing a reactive double bond in an amount within a range of from 0.01 to 40 parts by weight, and preferably a range of from 0.1 to 25 parts by weight. Furthermore, the ultraviolet absorbers are not necessarily used alone, but they are preferably used in combination of two or more of them.

Moreover, it is preferred that a hindered amine-base light stabilizer or an antioxidant is added in some cases.

For the other light-resisting materials for substrate protection, commercially available antioxidants and the like may be used. A material to be added is selected from that which has good dispersion stability in a composition, and which is not denatured by irradiation of light as in the case of the ultraviolet absorbers. Examples of such antioxidants include phosphoric acid-base antioxidants, sulfur-base antioxidants, phenol-base antioxidants, and hindered amine-base antioxidants.

A specific example of phosphoric acid-base antioxidants includes phosphite ester compounds such as trimethyl phosphite, triethyl phosphite, tri-n-butyl phosphite, trioctyl phosphite, tridecyl phosphite, tristearyl phosphite, trioleyl phosphite, tristridecyl phosphite, tricetyl phosphite, dilaurylhydrodiene phosphite, diphenylmonodecyl phosphite, diphenylmono(tridecyl) phosphite, tetraphenyldipropylene glycol diphosphite, 4,4'-butylidene-bis[3-methyl-6-t-(butyl)phenyl-di-tridecyl]phosphite, distearyl pentaerythritol diphosphite, ditridecyl pentaerythritol diphosphite, bis-nonylphenyl pentaerythritol diphosphite, diphenyloctyl phosphite, tetra(tridecyl)-4,4'-isopropylidenediphenyl diphosphite, tris(2,4-di-t-butylphenyl)phosphite, di(2,4-di-t-butylphenyl)pentaerythritol diphosphite.

All the well-known organic phosphorous compounds in phosphoric acid-base antioxidants may be used, for example, those described in Japanese Patent Application Publication Nos. 51-40589, 51-25064, 50-35097, 49-20928, 48-22330, and 51-35193 may be also used.

An example of the sulfur-base antioxidants includes the following compounds such as 3,3'-thiodipropionic di-n-dodecyl, 3,3'-thiodipropionic dimyristyl, 3,3'-thiodipropionic di-n-octadecyl, 2-mercaptobenzoimidazole, pentaerythritol-tetrakis-(β-lauryl, urylthiopropionate), ditridecyl-3,3'-thiodipropionate, 3,3'-thiodipropionic dimethyl, thioglycolic octadecyl, phenothiazine, β,β'-thiodipropionic acid, thioglycolic-n-butyl, ethyl thioglycolate, 2-ethylhexyl thioglycolate, isooctyl thioglycolate, n-octyl thioglycolate, di-t-dodecyl-disulfide, n-butylsulfide, di-n-amyldisulfide, n-dodecylsulfide, n-octadecylsulfide, and p-thiocresol.

An example of the phenol-base antioxidants includes the following compounds such as 2,6-di-t-butyl-p-cresol (BHT), 2,6-di-t-butylphenol, 2,4-di-methyl-6-t-butylphenol, butylhydroxyphenol, 2,2'-methylenebis(4-methyl-6-t-butylphenol), 4,4'-thiobis(3-methyl-6-t-butylphenol), bisphenol A, Dt-α-tocopherol, styrenated phenol, styrenated cresol, 3,5-di-t-butylhydroxybenzaldehyde, 2,6-di-t-butyl-4-hydroxymethylphenol, 2,6-di-s-butylphenol, 2,4-di-t-btylphenol, 3,5-di-t-butylphenol, o-n-buthoxyphenol, o-t-butylphenol, m-t-butylphenol, p-t-butylphenol, o-isobuthoxyphenol, o-n-propoxyphenol, o-cresol, 4,6-di-t-butyl-3-methylphenol, 2,6-dimethylphenol, 2,3,5,6-tetramethylphenol, 3-(3',5'-di-t-butyl-4'-hydroxyphenyl)propionic stearyl ester, 2,4,6-tri-t-butylphenol, 2,4,6-trimethylphenol, 2,4,6-tris(3',5'-di-t-butyl-4'-hydroxybenzyl)mesitylene, 1,6-hexanediol-bis[3-(3,5-di-t-butyl-4-hydroxyphenyl)propionate], 2,2'-thio-diethylenebis[3-(3,5-di-t-butyl-4-hydroxyphenyl) propionate], 2,2'-thiobis(4-methyl-6-t-butylphenol), 3,5-di-t-butyl-4-hydroxy-benzylphosphatol, o-n-propoxyphenol, o-cresol, 4,6-di-t-butyl-3-methylphenol, 2,6-dimethylphenol, 2,2-thio-diethylenebis[3-(3,5-di-t-butyl-4-hydroxyphenyl)propionate], 3,5-di-t-butyl-4-hydroxy-benzylphosphate-diethylester, 1,3,5-trimethyl-2,4,6-tris(3,5-di-t-butyl-4-hydroxybenzyl benzene, n-octadecyl-3-(3',5-di-t-butyl-4-hydroxyphenyl)propionate, 2-t-butyl-6(3'-t-butyl-5'-methyl-2-hydroxybenzyl)-4-methylphenyl acrylate, 4,4'-butylidene-bis(3-methyl-6-t-butylphenol), hydroquinone, 2,5-di-t-butyl hydroquinone, and tetramethyl hydroquinone.

An example of hindered amine-base antioxidants includes the following compounds such as bis(2,2,6,6-tetramethyl-4-piperidyl)sebacate, bis(1,2,2,6,6-pentamethyl-4-piperidyl) sebacate, 1-{2-[3-(3,5-di-t-butyl-4-hydrophenyl)propionyloxy]ethyl}-4-(3,5-di-t-butyl-4-hydroxypheny l)propionyloxy-2,2,6,6-tetramethylpyridine, 8-benzyl-7,7,9,9-tetramethyl-3-octyl-1,3,8-triazaspiro[4,5]undecane-2,4-dione, benzoyloxy-2,2,6,6-tetramethyl piperidine, 2,2,6,6-tetramethyl-4-piperidinol, and tetrakis(2,2,6,6-teto-tetramethyl-4-piperidyl/decyl)-1,2,3,4-butane tetracarboxylate.

These antioxidants may be used alone or in combination of two or more of them.

Furthermore, flame retardancy is controlled so as to exhibit resistance with respect to burning flame applied from a side to be controlled. As a flame-retardant material halogen-base, phosphorus-base and, inorganic-base flame retardants of an addition type may be used.

An example of halogen-base flame retardants includes bromine-base flame retardants such as tetrabromobisphenol A (TBA), hexabromobenzene, decabromodiphenyl ether, tetrabromoethane (TBE), tetrabromobutane (TBB), hexabromocyclodecane (HBCD); and chlorine-base flame retardants such as chlorinated paraffin, chlorinated polyphenyl, chlorinated diphenyl, perchloropentacyclodecane, and chlorinated naphthalene. When these flame retardants are used together with antimony trioxide or the like, more intensive effects can be obtained.

An example of phosphorus-base flame retardants includes tricresyl phosphate, tri(β-chloroethyl)phosphate, tri(dichloropropyl)phosphate, tri(dibromopropyl) phosphate, and 2,3-dibromopropyl-2,3-chloropropyl phosphate.

An example of inorganic-base flame retardants includes hydrates of aluminum hydroxide, magnesium hydroxide phosphoric ester or halide phosphoric ester and the like; zirconium hydroxide, basic magnesium carbonate, doromite, hydrotalcite, calcium hydroxide, barium hydroxide, and tin oxide; hydrates of inorganic metallic compounds such as borax; zinc borate, zinc metaborate, barium metaborate, zinc carbonate, magnesium-calcium carbonate, calcium carbonate, barium carbonate, magnesium oxide, molybdenum oxide, zirconium oxide, tin oxide, and red phosphorus. Among others, hydrates of at least one metallic compound selected from the group consisting of aluminum hydroxide, magnesium hydroxide, zirconium hydroxide, basic magnesium carbonate, doromite, and hydrotalcite, particularly, aluminum hydroxide, and magnesium hydroxide exhibit high flame-resisting effects, besides they are useful from the economical point of view.

Although a preferred particle diameter of the inorganic-base flame retardants is different from one another dependent upon types of retardants, for example, it is preferred that an average particle diameter is 20 μm or less, and more preferable is 10 μm or less in aluminum hydroxide, or magnesium hydroxide.

These flame retardants may be used alone or in combination of two or more of them.

In the case where halogen- or phosphorus-base flame retardants are selected, it is preferred that these flame retardants are incorporated into 100 parts by weight of a resin in a total amount within a range of from 5 to 50 parts by weight in a total amount of flame retardants, and more preferable is from 6 to 40 parts by weight. There is such a problem that when an amount of a flame retardant is incorporated in an amount less than 5 pars by weight, flame retardancy of a high level is difficult, while even when an amount of the flame retardant exceeds 50 parts by weight, flame retardancy is not so improved, but it becomes uneconomical.

On one hand, when an inorganic-base flame retardant is selected, it is preferred that the inorganic-base flame retardant is incorporated into 100 parts by weight of a resin in an amount within a range of from 30 to 200 parts by weight, and more preferable is from 40 to 150 parts by weight. When an amount of the inorganic-base flame retardant incorporated is less than 30 parts by weight, since flame retardancy becomes insufficient in a single use of the inorganic-base flame retardant, additional use of an organic-base flame retardant is required. On the other hand, when an amount of the inorganic-base flame retardant incorporated exceeds 200 parts by weight, it results in inferior wear resistance, decrease in mechanical strength, for example, decrease in high-impact strength and the like, disappearance of flexibility, and inferior low-temperature characteristics.

Since inorganic flame retardants have an advantage of producing no harmful gas such as a halogen gas, when it is burned off, it is particularly useful as a flame retardant.

A high-molecular material used for the sheet maintenance improver, which has no reactive double bond, is to be added for improving a sheet handlability (flexibility) and a tackiness on sheet surface, and such a material having a good compatibility with a compound containing a double bond is selected as the sheet maintenance improver. For instance, when a compound having a double bond is the one which is formed in a urethane skeleton and contains a (meth)acryloyl group, an acrylic resin made of methyl methacrylate, a polyester resin, a urethane resin and the like may be used. As a rough standard for selecting the high-molecular material, there is an SP (solubility parameter) value, and preferable is that materials each having a value of the SP close to each other are combined. Other than those enumerated, high-molecular materials such as fluororesins, silicone resins and the like may be used.

Optionally, a polar group such as a hydroxyl group, an amino group, a carboxyl group, a carbonyl group, and an epoxy group may be introduced further into the high-molecular material in order to improve adhesiveness of a glossiness control layer with respect to a base material, or a compatibility with a substrate protection material. Moreover, a peroxide may be added to the glossiness control layer according to necessity. Ordinary organic peroxides may be used for the peroxide, but a preferable peroxide is an organic peroxide having a decomposition temperature of 100° C. or higher in view of shelf life at ordinary temperatures.

A specific example of the organic peroxides includes 2,2-bis(tert-butylperoxy)butane, tert-butylperoxybenzoate, di-tert-butylperoxy isophthalate, methyl ethyl ketone peroxide, dicumyl peroxide, and tert-butylperoxy acetate. An amount of the peroxide to be added is preferably within a range of from 0.5 to 5.0 parts by weight with respect to 100 parts by weight of a low-molecular material having the (meth) acryloyl group. Moreover, the peroxide may not be limited to a single use, but two or more of them may be used together. As a result of adding such a peroxide, an area which is hardly cured by irradiation of light can be more easily hot-cured.

As to a binder constituting a glossiness control layer, a water-soluble binder may be used in place of the above-described resin. An example of the water-soluble binders includes water-soluble polymeric materials such as oxidized starch, phosphoric esterified starch, cationized starch, auto-denatured starch and a variety of denatured starches, polyethylene oxide, polyacrylamide, sodium polyacrylate, sodium alginate, hydroxylethyl cellulose, methyl cellulose, and polyvinyl alcohol or the derivatives thereof. Several types of these water-soluble polymeric materials in a mixture may be used in accordance with application purposes.

To a glossiness control layer, a small amount of a coloring material such as pigment and dye, and a fine particle material having a high hardness may be added in order to elevate a hardness of the resulting glossiness control layer according to necessity. Pigments and dyes applied in coating compositions may be used for the coloring materials. An example of the pigments includes titanium oxide, iron oxide, carbon black, cyanine-base pigments, and quinacridone-base pigments. An example of the dyes includes azo-base dyes, anthraquinone-base dyes, indigoid-base dyes, and stilbene-base dyes. Moreover, metallic powders such as aluminum flakes, nickel powders, gold powders and silver powders may be used as a coloring material. Preferable is that these materials are particles as finer as possible. On one hand, fine particles (volume average particle diameter: 20 nm or less) of titanium oxide, silica, diamond or the like may be used for elevating a hardness of the resulting product. When these coloring materials and the like are added, it is preferred to use the photoinitiator which starts an initiation reaction with a light having a wavelength in which a coloring material is less absorbed.

In the following, examples of a combination of materials consisting principally of acrylic-base materials will be shown in respect of a glossiness control layer. Materials of the other bases may also be similarly combined with each other.

I: A photocurable glossiness control layer consisting essentially of (a) an acrylic resin a weight average molecular weight of which is within a range of from 20,000 to 1,000,000, and is in solid state at ordinary temperatures; (b) a low-molecular weight material having a double bond in the molecule, and (c) a photoinitiator.

II: A photocurable glossiness control layer consisting essentially of (d) an acrylic resin which contains a plurality of at least one functional group selected from the group consisting of hydroxyl group, amino group, and carboxyl group in the molecule, a weight average molecular weight of which is within a range of from 20,000 to 1,000,000, and is in solid state at ordinary temperatures; (b) a low-molecular weight material having a double bond in the molecule, (c) a photoinitiator, and (e) at least one crosslinking agent selected from the group consisting of isocyanate-base crosslinking agents, melamine-base crosslinking agents, and epoxy-base crosslinking agents.

III: A photocurable glossiness control layer consisting essentially of (f) an acrylic resin which contains a plurality of reactive double bonds in the molecule, a weight average molecular weight of which is within a range of from 20,000 to 1,000,000, and is in solid state at ordinary temperatures; (b) a low-molecular weight material having a double bond in the molecule, and (c) a photoinitiator.

IV: A photocurable glossiness control layer consisting essentially of (g) an acrylic resin which contains a plurality of at least one functional group selected from the group consisting of hydroxyl group, amino group, and carboxyl group as well as a plurality of reactive double bonds in the molecule, a weight average molecular weight of which is within a range of from 20,000 to 1,000,000, and is in solid state at ordinary temperatures; (b) a low-molecular weight material having a double bond in the molecule, (c) a photoinitiator, and (e) at least one crosslinking agent selected from the group consisting of isocyanate-base crosslinking agents, melamine-base crosslinking agents, and epoxy-base crosslinking agents.

It is to be noted that an electron-ray curable glossiness control layer is prepared by using, for example, a composition which is the same as that applied to the above-mentioned photocurable resin except that the photoinitiator is removed from the above composition.

The acrylic resin (a) having a weight average molecular weight of 20,000 to 1,000,000 and being in a solid state at ordinary temperatures shown in the composition of the above-described glossiness control layer is obtained by, for example, copolymerizing a (meth)acrylic ester such as methyl (meth)acrylate, ethyl (meth)acrylate and butyl (meth) acrylate; with a styrene derivative monomer and the like or a maleic acid-base monomer in the presence of a reaction initiator (a variety of peroxides, chain transfer agents and the like).

The acrylic resin (d) containing a plurality of at least one functional group selected from the group consisting of hydroxyl group, amino group, and carboxyl group in the molecule, having a weight average molecular weight of 20,000 to 1,000,000, and being in solid state at ordinary temperatures shown in the composition of the above-described glossiness control layer is obtained by, for example, copolymerizing a monomer having at least one functional group among (meth)acrylic ester monomers each containing a carboxyl group such as (meth)acrylic acid, (meth)acrylic ester monomers each containing a hydroxyl group such as 2-hydroxyethyl(meth)acrylate, and 4-hydroxybutyl (meth) acrylate, and (meth)acrylic ester monomers each containing an amino group such as 2-aminoethyl (meth)acrylate, and 3-aminopropyl (meth)acrylate; with the other (meth)acrylic ester, a styrene derivative monomer or a maleic acid-base monomer in the presence of a reaction initiator (a variety of peroxides, chain transfer agents and the like).

The acrylic resin (f) containing a plurality of reactive double bonds in the molecule, having a weight average molecular weight of 20,000 to 1,000,000, and being in solid state at ordinary temperatures, and the acrylic resin (g) containing a plurality of at least one functional group selected from the group consisting of hydroxyl group, amino group, and carboxyl group as well as a plurality of reactive double bonds in the molecule, having a weight average molecular weight of 20,000 to 1,000,000, and being in solid state at ordinary temperatures shown in the composition of the above-described glossiness control layer is obtained by addition of a monomer containing the following functional groups to an acrylic-base copolymer containing the functional groups which is prepared by, for example, copolymerizing a monomer having at least one functional group among (meth) acrylic acid; (meth)acrylic ester monomers each containing a hydroxyl group such as 2-hydoxyethyl (meth)acrylate, and 4-hydroxybutyl (meth)acrylate; (meth)acrylic ester monomers each containing an amino group such as 2-aminoethyl (meth)acrylate, and 3-aminopropyl (meth)acrylate; (meth) acrylic ester monomers each containing an aziridinyl group such as 2-(1-aziridinyl)ethyl (meth)acrylate, and 2-(2-aziridinyl)butyl (meth)acrylate; and (meth)acrylic ester monomers each containing an epoxy group such as glycidyl (meth) acrylate; with the other (meth)acrylic ester, a styrene derivative monomer or a maleic acid-base monomer in the presence of a reaction initiator (a variety of peroxides, chain transfer agents and the like).

Each of the weight average molecular weights (Mw) of these acrylic resins (a), (d), (f), and (g) can be varied in accordance with the conditions in the case when a polymerization reaction is conducted by using a reaction initiator. The acrylic resin used in the invention has preferably a weight average molecular weight ranging from 20,000 to 1,000,000. When a weight average molecular weight is less than 20,000, there is such a fear that a sufficient elongation is not obtained with respect to a stretching in an operation of pasting a laminate film, so that cracks appear. On one hand, when a weight average molecular weight exceeds 1,000,000, it becomes difficult to dissolve the resin into a solvent, so that it is difficult to prepare a glossiness control layer from a photocurable resin composition. For instance, when a glossiness control layer is prepared by means of solvent casting, the resin can be cast at only a low concentration, because a viscosity of the resulting solution becomes high. For this reason, it is difficult to thicken a film thickness of a glossiness control layer.

These acrylic resins have preferably a Tg (glass transition point) ranging from −20 to 100° C. in view of a relationship between a hardness after curing a glossiness control layer and a resistance to scratching. However, an acrylic resin having even a Tg being out of the range is applicable in the case where not a so high surface hardness is required, for example, a hardness is sufficient for 2B or less (23° C.) in accordance with pencil hardness, or the case where an elongation of a glossiness control layer is scarcely required. Different types of acrylic resins may be used in combination thereof so far as they have a molecular weight within the above specified range, respectively. Since the acrylic resins (d) and (g) have functional groups such as hydroxyl groups, amino groups, and carboxyl groups, they are crosslinked by the use of the above-described crosslinking agents, whereby a flexibility of the resulting sheet can be elevated.

The acrylic resins (d) and (g) have preferably a total sum of a functional group value {OH group value and $NH_2$ group value ($NH_2$: an amount of $NH_2$ group to be added in case of polymerization is determined through either the same calculation as that of OH value or a manner wherein $NH_2$ group is reacted with nitrous acid to convert into OH group) and a COOH group value (COOH group value: an amount of COOH group to be added in case of polymerization is determined through either the same calculation as that of OH value or a titration of COOH group by KOH) is within a range of from 2 to 50. When a functional group value is less than 2, there is a case where a flexibility of a glossiness control layer cannot be elevated. On the other hand, when a functional group value exceeds 50, there is a case where a sufficient elongation of a glossiness control layer cannot be obtained. However, an acrylic resin having even a functional group value being out of the range is applicable in the case where an elongation of a glossiness control layer is scarcely required, or the case where a flexibility of a glossiness control layer is already sufficient.

Moreover, these acrylic resin materials may also be in the form of blocks or a comb-shaped block copolymer wherein reactive parts of an acrylic resin are made to turn into them. In this case, any combination of such reactive acrylic resin material is permissible with a material for making blocks which is acryl-base materials, as a matter of course, any material which can make blocks such as silicone-base, fluorine-base materials other than materials having good compatibility with acryl such as styrene-base, maleic acid-base, and imide-base materials. In this case, there is a manner wherein a weight average molecular weight of these materials is held within the above specified range, or a manner wherein these block copolymers are blended with the above-mentioned reactive acrylic resins.

An example of the low-molecular weight material (b) containing a double bond in the molecule shown in a composition of the glossiness control layer includes monofunctional type materials such as methyl (meth)acrylate, ethyl (meth)acrylate, benzyl (meth)acrylate, 2-ethoxyethyl (meth)acrylate, and phenoxydiethylene glycol (meth)acrylate; and polyfunctional type materials such as 1,6-hexanediol di(meth)acrylate, neopentyl glycol di(meth)acrylate, polyethylene glycol di(meth)acrylate, polypropylene glycol di(meth)acrylate, trimethylpropane tri(meth)acrylate, pentaerythritol tri(meth) acrylate, pentaerythritol tetra(meth)acrylate, and dipentaerythritol hexa(meth)acrylate.

Furthermore, an example of the low-molecular weight material (b) includes oligomers such as polyester acrylate, polyurethane acrylate, polyepoxy acrylate, polyether acrylate, oligoacrylate, polyalkyd acrylate, and polyol acrylate. These low-molecular weight materials may contain further functional groups such as hydroxyl groups, amino groups, and carboxyl groups.

The isocyanate-base crosslinking agents (e) mean an isocyanate compound having two or more of isocyanate groups in the molecule, and an example of which includes monomers such as tolylene diisocyanate, diphenylmethane diisocyanate, naphthalene diisocyanate, tolidine diisocyanate, triphenylmethane triisocyanate, tris(isocyanate phenyl) thiophosphite, p-phenylene diisocyanate, xylylene diisocyanate, bis(isocyanate methyl) cyclohexane, dicyclohexylmethane diisocyanate, hexamethylene diisocyanate, lysine diisocyanate, hexamethylene diisocyanate, and isophorone diisocyanate; or trimethylolpropane adducts of these monomers; isocyanurate modified materials; biuret modified materials; carbodiimide modified materials; urethane modified materials, and allophanate modified materials.

Furthermore, the melamine-base crosslinking agent (e) means etherified melamine resins prepared by reacting trimethylol melamine, hexamethylol melamine, dimethylolurea dimethylolguanidine, dimethylol acetoguanamine, or dimethylol benzoguanamine, which is obtained by reacting a material containing a functional amino group such as urea, thiourea, guanidine, guanamine, acetoguanamine, benzoguanamine, and dicyandiamide, including melamine with formaldehyde, with an alcohol such as butyl alcohol, and propyl alcohol.

Moreover, (e) means glycidyl compounds being a polyhydric alcohol containing a plurality of epoxy groups, and they are used together with a Lewis acid catalyst. The Lewis acid is preferably in the form of microcapsule in order to retard a reaction, and an example of the epoxy-base crosslinking agents includes glycidyl compounds such as butadiene oxide, hexadine dioxide, diglycidyl ester of phthalic acid, diglycidyl ether of bisphenol A, diglycidyl ether of bisphenol F, triglycidyl ether amine of paraminophenol, diglycidyl ether of aniline, tetraglycidyl ether of phenylenediamine, diglycidyl ether of sulfonamide, and triglycidyl ether of glycerin; polyether modified diglycidyl, polyester modified diglycidyl, urethane modified diglycidyl compound (polymer), vinylcyclohexene dioxide, and dicyclopentadiene dioxide.

An amount of these crosslinking agents to be added is preferably in such that a functional group value of an acrylic resin: a functional group value of a crosslinking agent is within a range of 1: around 0.7 to 1.3. In reality, however, such reactions between functional groups of an acrylic resin and crosslinking agents themselves, for example, reactions of melamine-base crosslinking agents themselves, reactions between the melamine-base crosslinking agents and epoxy-base crosslinking agents, and the like reactions occur, so that it is preferable to decide an amount of a crosslinking agent to be added after a preliminary experiment.

Although a filler constituting a glossiness control layer is not limited, when it is obtained from organic resin particles, a specific example thereof includes homopolymers or copolymers prepared by polymerizing at least one monomer of styrenes such as styrene, vinylstyrene, and chlorostyrene; monoolefins such as ethylene, propylene, butylene, and isobutylene; vinyl esters such as vinyl acetate, vinyl propionate, vinyl benzoate, and vinyl butyrate; esters of an $\alpha$-unsaturated aliphatic monocarboxylic acid such as methyl acrylate, ethyl acrylate, butyl acrylate, dodecyl acrylate, octyl acrylate, phenyl acrylate, methyl methacrylate, ethyl methacrylate, butyl methacrylate, and dodecyl methacrylate; vinyl ethers such as vinyl methyl ether, vinyl ethyl ether, and vinyl butyl ether; vinyl ketones such as vinyl methyl ketone, vinyl hexyl ketone, and vinyl isopropenyl ketone; and diene-base monomers such as isoprene, and 2-chlorobutadiene.

Among others, styrenes, esters of an $\alpha$-unsaturated aliphatic monocarboxylic acid, and the like are preferably used. In the case where these hot-melt resins are used as a filler, these resins are applied with the use of a solvent to which the resins are insoluble, they may be used as a filler for constituting a glossiness control layer. Fine particles prepared from a thermosetting resin obtained by adding a crosslinking agent or the like to these hot-melt resins, whereby crosslinked structures are allowed to contain therein, the above-described thermosetting resins, photocurable resins, electron ray-curable resins and the like are preferably used.

When a filler for constituting a glossiness control layer is prepared from inorganic fine particles, a specific example of such inorganic materials includes mica, talc, silica, calcium carbonate, zinc oxide, halloysite clay, kaolin, basic magnesium carbonate, quartz powder, titanium dioxide, barium sulfate, calcium sulfate, and alumina.

As a form of the filler, although a spherical form is usual, it may be a plate-like, a needle-like form, or amorphous forms are also applicable. A refractive index difference between a filler and a resin is preferably 0.01 or more for controlling a surface glossiness, and 0.1 or more refractive index difference is more preferable.

A volume average particle diameter of a filler is preferably 10 μm or less, and particularly preferable is that a volume average particle diameter is within a range of 0.01 to 5 μm, when a film thickness of a glossiness control layer is taken into consideration.

It is preferred that a weight ratio (filler: binder) of a filler and a binder in a glossiness control layer is within a range of 0.3:1 to 3:1, and more preferable is within a range of 0.5:1 to 2:1. When a ratio of the filler is within the range, gloss changes scarcely before and after image formation. However, when the ratio is less than that of the range, there is a case where light scattering properties decrease, while when the ratio is more than that of the range, there is a case where a glossiness control layer is hardly formed.

A functional layer having at least one function selected from those for controlling glossiness, resistance to light, antimicrobial activity, flame retardancy, releasability, and chargeability is preferably provided on a surface opposite to that on which an image is formed through a base material as described above. When a surface on which a functional layer having at least one function selected from those for controlling glossiness, resistance to light, antimicrobial activity, flame retardancy, releasability, and chargeability is provided is made to be the outside surface, not only resistance to light, but also releasability, for example, so as to be easily wiped off water which is unintentionally applied during use can be given. Furthermore, chargeability can be controlled in such that a surface resistivity is made to be less than $1.0\times10^{13}$ Ω/□ for the sake of making dusts to hardly adhere on a film surface. In addition, when antimicrobial activity is given to an image display material, the material may be held on a wall or the material may be taken up by patients in a hospital. Moreover, when a flame retardancy is applied to a material, it becomes possible to suppress that the material is burned off in case of fire disaster as much as possible, whereby production of a harmful gas can be also suppressed.

The above-described resistance to light, releasability, and chargeability can be controlled in accordance with the materials and the manners described as to the base materials, the glossiness control layers and the like which are used and applied in the invention.

In a sheet for forming process of the invention, an image reception layer containing at least a resin and a filler may be provided on a surface of a base material as a functional layer in order to obtain a good image. An specific example of the filler used in the image reception layer includes the same materials as that used in a glossiness control layer. Furthermore, although the same resin as that constituting the above-mentioned glossiness control layers may be used for the image reception layer, a hot-melt polyester resin is preferably used in the invention.

In general, the above-described polyester may be manufactured by a reaction of a polyhydroxy compound and a polybasic carboxylic acid or the reactive acid derivative thereof. An example of polyhydroxy compounds constituting a polyester includes diols such as ethylene glycol, diethylene glycol, triethylene glycol, 1,2-propylene glycol, 1,3-propylene glycol, 1,4-butanediol, and neopentyl glycol. Ethylene glycol and neopentyl glycol are particularly preferably used for the polyesters in the invention.

On one hand, an example of the polybasic carboxylic acids includes malonic acid, succinic acid, adipic acid, sebacic acid, alkylsuccinic acid, maleic acid, fumaric acid, mesaconic acid, citraconic acid, itaconic acid, glutaconic acid, cyclohexane dicarboxylic acid, isophthalic acid, terephthalic acid, and the other dicarboxylic acids. In the invention, isophthalic acid, and terephthalic acid are particularly preferably used in view of manufacturing, availability of materials, cost and the like. Generally, phthalic acid involves structural isomers of isophthalic acid and terephthalic acid. In this respect, both the phthalic acids exist inevitably in substantially the same ratio in case of manufacturing a polyester.

A particularly preferable mix proportion of ethylene glycol and neopentyl glycol(ethylene glycol: neopentyl glycol) in a polyhydroxy compound is within a range in a molar ratio of 3:7 to 1:9.

A number average molecular weight of the polyester is preferably within a range of 12000 to 45000, more preferable is within a range of 20000 to 30000. When a number average molecular weight is less than 12000, a softening point of the resulting resin is too low, even if a molar ratio of ethylene glycol and neopentyl glycol is within a desired range, so that there is a case where the resin becomes viscous even at ordinary temperatures. On the other hand, when a number average molecular weight exceeds 45000, a softening point becomes too high, so that fixability of an image (toner) becomes poor.

It is preferred that the image reception layer contains a releasable material such as natural waxes or synthetic waxes each being a low adhesiveness material to a fixing member, or releasable resins, reactive silane compounds, and modified silicone oils for preventing adherence or enwinding with respect to the fixing member in case of fixing an image.

A specific example of waxes includes natural waxes such as carnauba wax, beeswax, montan wax, paraffin wax, and microcrystalline wax; and synthetic waxes such as low-molecular weight polyethylene wax, low-molecular weight oxidation type polyethylene wax, low-molecular weight polypropylene wax, low-molecular weight oxidation type polypropylene wax, higher fatty acid wax, higher fatty acid ester wax, and Sasol wax. They may be used alone, and a plurality of them may also be used in the form of mixtures.

An example of releasable resins includes silicone resins; fluororesins; or modified silicone resins each being a modified resin of a silicone resin and a variety of resins such as polyester modified silicone resin, urethane modified silicone resin, acryl modified silicone resin, polyimide modified silicone resin, olefin modified silicone resin, ether modified silicone resin, alcohol modified silicone resin, fluorine modified silicone resin, amino modified silicone resin, mercapto modified silicone resin, and carboxy modified silicone resin; thermosetting silicone resins; and photocurable silicone resins.

The above-described modified silicone resin exhibits an affinity with a toner resin for an image forming material and resin particles of a hot-melt resin, and they are moderately blended with each other, dissolved mutually, and molten miscibly. Hence, it may be considered that color development of a pigment contained in a toner is excellent. In addition, it may be considered that sticking of a fixing member and a sheet for forming process can be prevented at the time of hot-melting due to releasing properties of a silicone resin.

In the invention, a reactive silane compound and a modified silicone oil may be further admixed in order to obtain a lower adhesivity. The reactive silane compound reacts with a resin contained in an image reception layer, and at the same time, it reacts with the modified silicone oil. As a result, the reactive silane compound functions as a releasing agent being stronger than the silicone oil, besides it cures itself, so that it is firmly secured in the image reception layer. Thus, such releasing agent is never removed by even mechanical wearing or solvent extraction.

These wax and releasable resin may exist together in a particle condition as in the case of resin particles made of the above-described hot-melt resin. It is preferred that these wax and releasable resin are added into the hot-melt resin, they are incorporated into the hot-melt resin in a state wherein these wax and releasable resin are dispersed and mutually dissolved thereinto, and the resulting product is utilized as it is.

As mentioned already, a surface resistivity in an image reception layer must be within a range of from $1.0\times10^8$ to $1.0\times10^{13}$ Ω/□. In order to control a surface resistivity within the range, a charge control agent such as a high-molecular conductant agent, a surfactant, electroconductive metal oxide particles or the like may be added to the image reception layer. For the sake of elevating a conveyorability, a matting agent is preferably added.

An example of the electroconductive metal oxide particles includes ZnO, TiO, $TiO_2$, $SnO_2$, $Al_2O_3$, $In_2O_3$, SiO, $SiO_2$, MgO, BaO, and $MoO_3$. They may be used alone or in combination thereof. It is preferred that a metal oxide contains further an element of a different type. For instance, it is preferable to contain (dope) Al, In or the like into ZnO; to contain Nb, Ta or the like into TiO; and to contain Sb, Nb, a halogen element or the like into $SnO_2$. Among others, $SnO_2$ doped with Sb is particularly preferable, because electroconductivity thereof changes scarcely with age, so that stability is high.

An example of a resin having lubricity and used in the above-described matting agent includes polyolefins such as polyethylene; and fluororesins such as vinyl polyfluoride, vinylidene polyfluoride, and polytetrafluoroethylene (TEFLON (Registered trade mark)). A specific example includes low-molecular weight polyolefin-base waxes (e.g. polyethylene-base waxes, 1000 to 5000 molecular weight), high-density polyethylene-base waxes, and paraffin-base or microcrystalline-base waxes.

An example of fluororesins includes polytetrafluoroethylene (PTFE) dispersion.

A volume average particle diameter of the above-described resin matting agent is preferably within a rage of 0.1 to 15 μm, and more preferable is within a range of 1 to 10 μm. Although a larger volume average particle diameter is preferable, an excessive particle diameter results in desorption of the matting agent from an image reception layer to brings about a powder omission phenomenon, whereby a surface is easily worn and damaged, besides blooming (degree of haze) increases.

A content of the matting agent is preferably within a range of 0.1 to 10% by weight, and more preferably is within a range of 0.5 to 5% by weight with respect to a resin contained in an image reception layer.

The above-described matting agent is preferably in the form of a planiform. In this respect, a matting agent which has been previously shaped so as to have a planiform may be used, or an image reception layer is coated with a matting agent which has a comparatively low softening temperature, and it may be shaped into a planiform under heating in case of drying the image reception layer. Moreover, a matting agent may be made to be a planiform while pressing it under heating. In any of the above cases, however, it is preferred that a matting agent projects from a surface of an image reception layer in a convex manner.

Other than that mentioned above, inorganic fine particles (e.g. $SiO_2$, $Al_2O_3$, talc or kaolin) and bead-shaped plastic powders (e.g. crosslinking type PMMA, polycarbonate, polyethylene terephthalate, or polystyrene) may be used together with a matting agent.

As described above, it is preferred to reduce a friction on a surface of a sheet for forming process by means of a matting agent and the like in order to make a conveyorability of the sheet for forming process good. In an actual application, a coefficient of static friction on a surface of a sheet for forming process is preferably less than 2, and less than 1 is more preferable. On one hand, a coefficient of dynamic friction on a surface of a sheet for forming process is preferably within a range of 0.2 to 1, and more preferably within a range of 0.3 to 0.65.

In a sheet for forming process having an image reception layer on a surface thereof, it is desirable to contain a material of antimicrobial activity in at least the outermost surface of an image reception layer in accordance with its purpose. A material to be added is selected from those which has good dispersion stability in a composition, and is not denatured by irradiation of light.

An example of antimicrobial agents of organic-base materials includes thiocyanato compounds, propargyl derivatives, isothiazolinone derivatives, trihalomethylthio compounds, quaternary ammonium salts, biguanide compounds, aldehydes, phenols, benzimidazole derivatives, pyridine oxide, carbanilide, and diphenyl ether.

On one hand, an example of antimicrobial agents of inorganic-base materials includes zeolite-base, silica gel-base, glass-base, calcium phosphate-base, zirconium phosphate-base, and silicate-base materials; titanium oxide; and zinc oxide.

A volume average particle diameter of the inorganic-base antimicrobial agents is preferably within a range of 0.1 to 10 μm, and more preferable is within a range of 0.3 to 5 μm. Each of the inorganic-base antimicrobial agents is preferably exposed on a surface of the image reception layer. Accordingly, a volume average particle diameter is selected in accordance with a film thickness of the image reception layer. An excessive volume average particle diameter results in desorption of an antimicrobial agent from the image reception layer to brings about a powder omission phenomenon, whereby a surface is easily worn and damaged, besides blooming (degree of haze) increases.

A content of the antimicrobial agent is preferably within a range of 0.05 to 5% by weight with respect to a resin contained in an image reception layer, and more preferable is within a range of 0.1 to 3% by weight.

Additives such as a light-resisting material, an antibacterial material, a flame-retardant material, a releasing material, a charge control agent, and a matting agent may be added to a glossiness control layer composed of the above-mentioned resin, filler and the like in order to add further advantages. However, it is preferred that the matting agent is added to the glossiness control layer within a range of 0.1 to 10% by weight, and more preferably within a range of 0.5 to 5% by weight from the viewpoint of a relationship between the matting agent and the filler. Furthermore, a volume average particle diameter of a matting agent to be added to a glossiness control layer is preferably within a range of 0.1 to 10 μm, and more preferably within a range of 1 to 5 μm.

According to necessity, an image reception layer and a glossiness control layer may be used together with a variety of additives for plastics such as a heat stabilizer, an oxidation stabilizer, a light stabilizer, a lubricant, a pigment, a plasticizer, a crosslinking agent, an impact strength modifier, an antimicrobial agent, a flame retardant, a flame retarder assistant, and a charge control agent.

The above-described base material of the sheet for forming process according to the invention may contains at least two layers and at least one layer of the base material contains a polyester resin prepared by copolymerizing at least ethylene glycol, terephthalic acid, and 1,4-cyclohexanedimethanol.

Furthermore, the above-described functional layer in a sheet for forming process of the invention may be an image reception layer containing at least a resin and a filler.

In the case when a functional layer is the image reception layer, the resin contained in the image reception layer may be a polyester resin.

Moreover, the functional layer in a sheet for forming process of the invention may contain at least one selected from a charge control agents, an antimicrobial agents, an ultraviolet absorbers, and an antioxidants.

The above-described base material in a sheet for forming process of the invention may be transparent.

The base material in a sheet for forming process of the invention may be formed from a nonchlorine-base resin.

Besides, in the case when a functional layer on a sheet for forming process according to the invention is an image reception layer, the functional layer having at least one function selected from those for controlling glossiness, resistance to light, antimicrobial activity, flame retardancy, releasability, and chargeability may be provided on a side of the base material that is opposite from the surface on which the image receiving layer is formed.

On a surface of the functional layer in a sheet for forming process of the invention, a toner image may be formed by means of an electrophotographic method. The toner image may be formed in a reflected image. In addition, a protection layer for protecting the toner image may be further provided on a sheet for forming process of the invention. The protection layer may be a white color.

<Method for Manufacturing Sheet for Forming Process>

A method for manufacturing a sheet for forming process of the invention contains a step of forming the functional layer on the surface of the base material by using a coating solution, wherein a solvent used for the coating solution is a good solvent for at least one selected from polycarbonate resins and polyarylate resins and the functional layer is formed while dissolving the surface of the base material.

The functional layer may be formed by mixing at least a resin, a filler and the like by using an organic solvent which is a good solvent with respect to at least one selected from the polycarbonate resins, and the polyarylate resins; dispersing homogeneously by means of a device such as an ultrasonic instrument, a wave rotor, an Atliter, and a sand mill to prepare a coating solution, and applying or impregnating the coating solution onto a surface of a base material as it is.

A manner for applying or impregnating such coating solution may be the one applied usually, and an example of which includes blade coating method, wire bar coating method, spray coating method, immersion coating method, bead coating method, air-knife coating, curtain coating, and roll coating method.

If there are both the glossiness control layer and image reception layer, an order for coating is not specified, and they may be applied at the same time.

When a solvent used for a coating solution is a good solvent with respect to at least one selected from polycarbonate resins and polyarylate resins, a bonding of a base material and a functional layer becomes highly positive. The cause may be considered in such that when a poor solvent is used, adhesiveness between the base material and the functional layer becomes insufficient because of a clear existence of an interface therebetween, while when a good solvent is used, there is no clear interface, so that a surface of the base material and the functional layer fuse together, resulting in sufficiently high adhesiveness.

It is to be noted that the expression "a good solvent with respect to at least one selected from polycarbonate resins and polyarylate resins" means that when the solvent is in contact with at least one selected from polycarbonate resins and polyarylate resins, the solvent exhibits a solubility with respect to the resin(s) being in contact therewith at such or a higher degree that a surface of a base material is slightly invaded (a slight blooming or the like is observed on the surface after removing the solvent) as a result of any action which is applied to the resins(s) by the solvent.

A solvent compatible with both at least one selected from polycarbonate resins and polyarylate resins, and a resin contained in the functional layer is not specifically limited, but any well-known solvent used for a preparation of a coating solution is applicable. In this respect, however, the same kind of solvents are preferably used for both the polycarbonate resins and polyacrylate resins. A specific example of them includes aromatic hydrocarbons such as toluene, and xylene; halogenated hydrocarbons such as methylene chloride, and chlorobenzene; ketones such as methyl ethyl ketone, and cyclohexanone; besides tetrahydrofuran, ethyl acetate, and the mixtures of these solvents; or the other mixed solvents with poor solvents may be included.

Air-drying is applicable as a drying manner for forming a functional layer on a surface of a base material, but thermodrying is easier. As a drying manner, any of manners employed usually such as a manner for placing a target material in an oven, a manner for passing a target material through an oven, a manner for allowing a target material to be in contact with heating rollers is applicable. Moreover, the above-mentioned glossiness control layer may be formed in accordance with the same manner as that described just above.

A film thickness of a functional layer which is formed on a surface of a base material as mentioned above and having at least one function selected from those for controlling glossiness, resistance to light, antimicrobial activity, flame retardancy, releasability, and chargeability is preferably within a range of 0.1 to 20 μm, and more preferable is within a range of 1.0 to 10 μm.

Moreover, a film thickness of an image reception layer is preferably within a range of 0.1 to 20 μm, and more preferably within a range of 1.0 to 10 μm as in the case described above.

<Method for Forming Image>

In a method for forming an image according to the invention, a toner image is formed on a surface of the above-described functional layer in a sheet for forming process of the invention by means of an electrophotographic method. It is preferred that the toner image is formed on an image reception layer provided on the sheet for forming process of the invention.

In the following, a method for forming an image according to the invention will be described.

In an image formation by means of electrophotography, a surface of a photosensitive body for electrophotography (image bearing body) is charged by applying uniformly electric charge on the surface, and then, the surface is exposed in response to image information to form an electrostatic latent image corresponding to the exposure. Thereafter, when a toner being an image forming material is supplied to the electrostatic latent image on the surface of photosensitive body for electrophotography from a developing device, the electrostatic latent image is visibly developed (a toner image is formed) by the toner. Further, the toner image formed is transferred to a surface on which an image reception layer is formed in the sheet for forming process, and finally, the toner is fixed on the surface of the image reception layer by means of heat, pressure or the like, whereby an image recording body is completed. The image recording body referred herein is a sheet for forming process of the invention.

In a sheet for forming process, an image formation surface may be used as a backside of the sheet. In this case, an image to be formed on an image reception layer of a sheet for forming process, which has not yet been printed, is required to be a reverse image (reflected image). Accordingly, when an electrostatic latent image is formed on a surface of a photosensitive body, information as to a reflected image is preferably provided as image information to be exposed on the surface of the photosensitive body.

In an image formation according to the electrophotographic method of the invention, a result of a stretched condition due to a metallic mold at the time of fabricating a forming processed product has been previously forecasted, and when a degree of a distortion in picture and character images, and positions to be indicated are set out based on the forecasted result, a forming processed product having a more accurate image can be fabricated.

In general, since a heat and a pressure are applied at the same time in case of fixing, a toner is fixed on a surface of an image reception layer, and on one hand, since the toner is in contact with a fixing member, there is a case where a part of the toner is moved to the fixing member and remains on the fixing member as an offset in the case when the toner has a low viscosity and high affinity with the fixing member. For this reason, it results in deterioration of the fixing member, and in turn, a life of a fixing device is shortened. Under the circumstances, when a sheet for forming process is used as an image recording body, it is required to obtain a sufficient fixability and releasability with respect to a fixing member.

However, since a surface of an image reception layer and a surface of a base material according to the invention have a good adhesiveness with a toner, it is sufficiently fixed on a surface of a sheet for forming process at a temperature equal to or lower than that at which the toner melts and becomes viscous.

For this reason it is preferred in the invention that a toner image formed on a surface of a sheet for forming process is fixed in such a condition that a temperature of a surface of the sheet for forming process is made to be that equal to or lower than a melting temperature of a toner applied. When a melting temperature of an ordinary toner is taken into consideration, the toner is preferably fixed in such a condition that a surface temperature of the sheet for forming process is equal to or lower than 125° C., and more preferable is 110° C. or lower temperature.

Even if a fixing operation is made under the above-described condition, there is a case where a temperature of a base material runs into a region where thermal deformation appears in a sheet for forming process of the invention. In this case, particularly stiffness in the base material decreases so that the base material enwinds easily around heating rolls in a fixing device. In such a case, it is desired that the sheet for forming process is conveyed together with a paper superposed on the sheet, a stiffness of a laminate film is compensated in the fixing device, or inside the fixing device is recreated/adjusted in such that a guide abuts on a film edge portion.

On one hand, a sheet for forming process of the invention comes to be in contact with a fixing member in also non-image area in case of fixing, so that releasable performance and the like are required as in the case of a toner.

Thus, it is preferred in the invention to form an image reception layer made of at least a hot-melt polyester resin on either surface of a base material. Furthermore, it is also preferred to form a glossiness control layer (functional layer) containing preferably a hot-melt resin, or a thermosetting resin, a photocurable resin, and an electron-ray curable resin, and in addition, a filler and the like on a surface opposite to that on which an image is formed in a sheet for forming process. Moreover, a releasing agent is preferably contained in both the layers as an additive. Hence, it is intended to prevent adherence with respect to a fixing member in a fixing step. Besides, when a charge control agent is added, transferability can also be maintained in electrophotographic method.

According to the invention, a functional layer having at least one function selected from those for controlling glossiness, resistance to light, antimicrobial activity, flame retardancy, releasability, and chargeability is formed on at least either surface of a base material, and a reflected image is formed on the surface opposite to that on which the functional layer is formed through the base material, whereby a desired sheet for forming process can be obtained.

The sheet for forming process of the invention is excellent in an image quality (color, gloss, masking property and the like) required in a printed matter containing a high-level design, and repetition stability in an image formation step, without accompanying appearance of any image defect due to scratches or foreign matters, and in addition, assures sufficient heat resistance and resistance to light even in an outdoor application thereof. In accordance with the invention, a sheet for forming process having the above-described performance and accompanying no offset with respect to even an oil-less toner, a method for manufacturing the same, and a method for forming an image by using the sheet for forming process may be provided.

In a sheet for forming process of the invention, since a functional layer is provided on a surface opposite to that on which an image is formed through a base material, a variety of functions such as heat resistance, resistance to light, antimicrobial activity, flame retardancy, moisture resistance, water repellency, wear resistance, and scratch resistance in addition to gloss can be added and/or elevated. A specific example of a sheet for forming process to which functions are added and/or elevated includes a sheet wherein a reflected image is formed on a backside of an image recording body (sheet for forming process), while a silicone hard coating layer having glossiness controllability, resistance to light, antimicrobial activity, flame retardancy, heat resistance, water repellency, wear resistance and the like is formed on a surface thereof. Furthermore, a sheet for forming process on a surface of which a glossiness control layer is formed and gloss is suppressed is preferably utilized as a bulletin board. Thus, functions that can respond to a variety of manners for application may be added to a sheet for forming process of the invention.

In a sheet for forming process of the invention, a protection layer for protecting a typed-out toner image is preferably formed. The protection layer is the one for preventing desorption, scratching, and contamination of an image such as a picture from physical and chemical damages in a friction with a metallic mold in case of sheet formation, or during operations at the time of fabricating a forming processed product.

A protection layer may be formed by selecting at least one from the above-described various resins, dissolving the resin into a solvent or dispersing the resin into water, and applying the resulting solution or dispersion on a sheet for forming process. Likewise, a protection layer may be applied and formed by the use of a solventless type resin such as acryl-base radiation curable type resins, and UV curable type resins.

A protection layer may be colored in accordance with a picture in a design. In this respect, color toners used in an electrophotography are usually four colors including three primary colors of yellow, magenta and cyan, and black wherein white color cannot be produced. Accordingly, a color of the protection layer is preferably white. The most popular white pigment is principally titanium oxide, and other than that there are inorganic pigments such as zinc oxide, zirconium oxide, barium sulfate, and antimony oxide. Further, the above-described fine resin particles may be mixed with these inorganic pigments.

A thickness of the protection layer is preferably 1 to 100 μm dependent on properties of a resin applied, more preferable is 5 to 80 μm, and particularly preferable is 10 to 50 μm.

<Forming Processed Product and Method for Manufacturing Same>

A method for manufacturing a forming processed product according to the invention includes an image formation step for forming a toner image on a surface of a functional layer in a sheet for forming process of the invention by means of an electrophotographic method; a protection layer formation step for providing a protection layer on the sheet for forming process so as to cover the toner image; and a processing step for processing the sheet for forming process on which the protection layer is provided.

Furthermore, a forming processed product of the invention includes a sheet for forming process of the invention wherein a toner image is formed on a surface of the functional layer by means of an electrophotographic method; and a protection layer covering the toner image.

In the method for manufacturing a forming processed product of the invention, a method for processing a sheet for forming process used in the above-described processing step is not specifically limited.

An example of the toner images includes a picture, a pattern or design, a character, or a combination thereof.

A specific example of a method for processing a sheet for forming process includes a sheet forming method. Manufacturing a variety of plastic containers such as cup-shaped or tray-shaped containers from a monolayer or multilayer plastic sheet in accordance with the sheet forming method is a well-known technology.

The sheet forming method is called also by the name of a thermoforming method which relates to a manner wherein generally, a plastic sheet heated and softened is deformed by an external force due to vacuum, reduced pressure, application of pressure, or compression, and cooled at the same time, whereby a formed product is obtained. In general, a sheet forming method means vacuum forming and compression forming, or a combination thereof. A drawing method wherein a plastic sheet heated and softened is forcibly applied to a male or female die to process into a product having a desired shape is a kind of the sheet forming method.

There are two types of a manner for preliminary heating of a sheet. One of them is a contact heating method wherein a forming sheet is sandwiched between upper and lower heaters, and the heaters are allowed to be directly in contact with a region to be formed in the sheet, whereby the desired region of the sheet is heated and softened. On one hand, the other type is a non-contact heating method wherein a gap is maintained between a heater and a forming sheet, and the sheet thus placed in a non-contact state is heated and softened by means of radiant heat. The contact heating method involves disadvantages of a tentative retention of feeding during heating of a forming sheet, and difficulty in forming multiple products. However, only the region to be formed is easily heated in a forming sheet, so that efficiency of applied heat is good. On the other hand, the non-contact heating method can respond to application of a continuous sheet or a wide-breadth sheet, and can feed a forming sheet with no retention thereof, although it depends on types of heating devices or forming devices.

Since a forming processed product of the invention is partially stretched according to sheet forming, there are many regions each thickness of which becomes basically thinner than an initial thickness of the sheet. If a forming processed product is required to have a certain strength in case of application, there is a case the product exhibits insufficient strength. In such a case, the insufficient strength of the product can be supplemented by filling concave regions in the forming processed product (processed sheet for forming process) with a filler such as thermoplastic resins and the like while giving attention to the pictures involved in the forming processed product, and deformation thereof.

In a method for manufacturing a forming processed product of the invention, the above-described toner image may be a picture, a pattern or design, a character, or combinations thereof.

Furthermore, in the method for manufacturing a forming processed product of the invention, the above-described processing may be applied by means of a sheet forming method.

Moreover, the method for manufacturing a forming processed product of the invention may further comprise further a filling step for filling concave regions in the processed sheet for forming process with a filler.

Besides, in a forming processed product of the invention, the processed sheet for forming process may contain concave regions, and the concave regions may be filled with filler.

EXAMPLES

The present invention will be further specifically described hereinafter by referring to examples, but it is to be noted that the invention is not limited to these examples.

All the "part" appeared in the following examples and comparative examples are represented by "part by weight".

Example 1

A sheet for forming process of the present invention is manufactured. In the following, a method for manufacturing the same will be described in every steps.

<Preparation of Functional Layer Coating Solution A-1>

Ten parts of a polyester resin (trade name: THERMOLAC F-2, manufactured by Soken Chemical and Engineering Co., Ltd.; 30% by weight solid content in methyl ethyl ketone) as a hot-melt resin, 9 parts of melamine-formaldehyde condensate fine particles (trade name: EPOSTAR S, manufactured by Nippon Shokubai Co., Ltd.; average particle diameter: 0.3 μm) as a filler, 0.5 part of a surfactant (trade name: ELEGAN 264WAX, manufactured by NOF Corporation), 30 parts of methyl ethyl ketone, and 5 parts of cyclohexanone are mixed together, and agitated sufficiently to prepare a functional layer coating solution A-1 for controlling surface gloss and surface resistivity.

<Preparation of Image Reception Layer Coating Solution B-1>

Three parts of a polyester resin (trade name: VYLON 200, manufactured by Toyobo Co., Ltd.) as a hot-melt resin, 0.05 part of crosslinkage type methacrylic ester copolymer fine particles (trade name: MX-500, manufactured by Soken Chemical and Engineering Co., Ltd.; volume average particle diameter: 5 μm) as a matting agent (double as a filler), 0.2 part of 2-(2-hydroxy-5-methylphenyl)-2H-benzotriazole (trade name: SUMISORB 200, manufactured by Sumitomo Chemical Co., Ltd.) as an ultraviolet absorber, and 0.1 part of a surfactant (trade name: ELEGAN 264WAX, manufactured by NOF Corporation) are added to a mixed solvent composed of 40 parts of methyl ethyl ketone, and 5 parts of cyclohexanone, and agitated sufficiently to prepare an image reception layer coating solution B-1.

<Fabrication of Sheet for Forming Process 1, Evaluation Thereof>

The above-described functional layer coating solution A-1 is applied to either side of a base material being a polycarbonate sheet containing bisphenol A (PC (A); trade name: IUPILON S-2000, manufactured by Mitsubishi Engineering-Plastics Corporation; thickness: 200 μm) by the use of a wire bar, and dried at 90° C. for one minute to form a functional layer of 1 μm film thickness for controlling gloss and chargeability.

Furthermore, the above-described image reception layer coating solution B-1 is similarly applied to an uncoated surface opposite to that on which the functional layer coating solution A-1 is applied in the base material, and dried at 90° C. for one minute to form an image reception layer (coated layer) of 1.5 μm film thickness, whereby a sheet for forming process 1 is fabricated.

In the sheet for forming process 1, each surface resistivity is $1.0\times10^{13}$ Ω/□ in a surface of the functional layer, while $1.50\times10^{11}$ Ω/□ in a surface of the image reception layer.

Then, the sheet for forming process 1 is cut into A-4 size (210 mm×297 mm).

<Performance Evaluation of Sheet for Forming Process>

A colored reflected image containing a solid image is output and printed out on a surface of the image reception layer in the sheet for forming process 1 (an image has not yet been formed) by means of a color copying machine (trade name: DOCUCOLOR 1255CP, manufactured by Fuji Xerox Co., Ltd.) to fabricate the sheet for forming process 1 on which the image is formed. The reflected image is an output image wherein a displace magnitude thereof after the forming process has been previously calculated by the use of a personal computer.

As to the sheet for forming process 1, a traveling performance of a conveyance in the machine, a fixability of image, an image concentration after printing the image and the like are measured. In addition, light-resisting properties of the image formed are evaluated, whereby performance of a sheet for forming process is confirmed.

Evaluation of Traveling Performance

Traveling performance of the fabricated sheet for forming process 1 in a color copying machine is conducted in such that 20 pieces of the sheet for forming process 1 are set in a paper manually-feeding tray of the color copy DocuColor 1255CP, continuous printing operation of 20 pieces is made twice, and the number of times in appearance of jamming (i.e. overlapped conveyance of papers) is counted. An evaluation standard is such that the number of times in 0 appearance of jamming is A, the number of times in 1 appearance is B, and the number of times in 2 or more appearance is C.

Evaluation of Fixability

Evaluation of fixability is made in such that a commercially available cellophane adhesive tape having 18 mm breadth (trade name: CELLOTAPE, manufactured by NICHIBAN CO., LTD.) is applied with 300 g/cm linear pressure to a solid image area having about 1.8 image concentration of the image fixed on the surface of the sheet for forming process 1 by means of the electrophotographic copying machine, and then, the adhesive tape is exfoliated at a rate of 10 mm/sec wherein a ratio of a concentration in an image after the exfoliation with respect to a concentration in the image before the exfoliation (a concentration of an image after exfoliation/a concentration of the image before exfoliation, hereinafter referred simply to as "OD ratio") is made to be an indication pointer, based on which evaluation is implemented. In general, a toner fixability of about 0.8 or more in OD ratio is required for an electrophotographic recording medium. In the present evaluation, 0.9 or more OD ratio is indicated by A, 0.8 or more and less than 0.9 OD ratio are indicated by B, and less than 0.8 OD ratio is indicated by C. As to a concentration of an image, a solid image area is measured by a photographic densitometer (trade name: X-Rite 968 densitometer, manufactured by X-Rite Corporation).

Evaluation of Image Concentration, Image Quality

As to an image concentration, a solid image area is measured by a photographic densitometer an X-Rite 968 densitometer (manufactured by X-Rite Corporation) wherein 1.5 or more image concentration is indicated by A, less than 1.5 and 1.3 or more image concentration are indicated by B, and less than that mentioned above is indicated by C.

Furthermore, as to an image quality, evaluations are made on correct printability of characters (printing reproducibility) under high-temperature and high-humidity conditions (28° C., 80% RH, P-condition), room temperature conditions (22° C., 50% RH, Q-condition), and low-temperature and low-humidity conditions (15° C., 15% RH, R-condition), respectively, wherein A is in case of no problem under any condition, while C plus a certain condition are in case of a problem under the certain condition (for example, P—C, R—C and the like)

Evaluation of Resistance to Light

As to evaluations of resistance to light, the formation-setting sheet 1 is set in a light-resisting tester (trade name: SUNTEST CPS+, manufactured by TOYO SEIKI Co., Ltd.) in such that a surface on which solid image is printed in the sheet for forming process 1 is directed downwards, and the solid image is irradiated by a Xe lamp at 760 $W/m^2$ intensity for 100 hours under 63° C. atmosphere. Then, image concentrations before and after the irradiation are measured, and when a difference between them is less than 0.1 is indicated by A, 0.1 or more and 0.5 or less are indicated by B, 0.5 or more and 1.0 or less is indicated by C, and more than 1.0 is indicated by D, respectively.

The results mentioned above are collectively indicated in Table 1.

Example 2

<Fabrication of Sheet for Forming Process 2, Evaluation Thereof>

A sheet for forming process 2 is fabricated in accordance with the same manner as that of example 1 except that a polycarbonate sheet containing bisphenol Z (PC(Z); manufactured by Mitsubishi Engineering-Plastics Corporation, thickness: 200 μm) is employed in place of the polycarbonate sheet containing bisphenol A used in example 1.

In the sheet for forming process 2, each surface resistivity is $9.7\times10^{12}$ Ω/□ in a surface of the functional layer, while $1.67\times10^{11}$ Ω/□ in a surface of the image reception layer.

The sheet for forming process 2 is cut into A-4 size, the same evaluations as those of example 1 are made on these test samples, and the results obtained are collectively indicated in Table 1.

Example 3

<Fabrication of Sheet for Forming Process 3, Evaluation Thereof>

A sheet for forming process 3 is fabricated in accordance with the same manner as that of example 1 except that a polycarbonate sheet containing bisphenol AP(PC(AP); manufactured by Mitsubishi Engineering-Plastics Corporation, thickness: 200 μm) is employed in place of the polycarbonate sheet containing bisphenol A used in example 1.

In the sheet for forming process 3, each surface resistivity is $7.4\times10^{11}$ Ω/□ in a surface of the functional layer, while $3.3\times10^{11}$ Ω/□ in a surface of the image reception layer. The sheet for forming process 3 is cut into A-4 size, the same evaluations as those of example 1 are made on these test samples, and the results obtained are collectively indicated in Table 1.

Example 4

<Fabrication of Sheet for Forming Process 4, Evaluation Thereof>

A sheet for forming process 4 is fabricated in accordance with the same manner as that of example 1 except that a polyarylate sheet containing bisphenol A (PAR(A); trade name: U POLYMER, manufactured by UNITIKA.LTD., thickness: 200 μm) is employed in place of the polycarbonate sheet containing bisphenol A used in example 1.

In the sheet for forming process 4, each surface resistivity is $9.3\times10^{11}$ Ω/□ in a surface of the functional layer, while $2.80\times10^{11}$ Ω/□ in a surface of the image reception layer. The sheet for forming process 4 is cut into A-4 size, the same evaluations as those of example 1 are made on these test samples, and the results obtained are collectively indicated in Table 1.

Example 5

<Fabrication of Sheet for Forming Process 5, Evaluation Thereof>

A sheet for forming process 5 is fabricated in accordance with the same manner as that of example 1 except that a polyarylate containing bisphenol A(PAR)/PET/polyarylate (PAR) three-layer sheet (manufactured by UNITIKA.LTD., thickness: 200 μm) is employed in place of the polyarylate sheet containing bisphenol A used in example 4.

In the sheet for forming process 5, each surface resistivity is $8.7\times10^{11}$ Ω/□ in a surface of the functional layer, while $1.6\times10^{11}$ Ω/□ in a surface of the image reception layer. The sheet for forming process 5 is cut into A-4 size, the same evaluations as those of example 1 are made on these test samples, and the results obtained are collectively indicated in Table 1.

Example 6

<Fabrication of Sheet for Forming Process 6, Evaluation Thereof>

A sheet for forming process 6 is fabricated in accordance with the same manner as that of example 1 except that a polyarylate sheet containing bisphenol Z (PAR (Z); manufactured by UNITIKA.LTD., thickness: 200 μm) is employed in place of the polyarylate sheet containing bisphenol A used in example 4.

In the sheet for forming process 6, each surface resistivity is $2.9\times10^{11}$ Ω/□ in a surface of the functional layer, while $3.35\times10^{10}$ Ω/□ in a surface of the image reception layer. The sheet for forming process 6 is cut into A-4 size, the same evaluations as those of example 1 are made on these test samples, and the results obtained are collectively indicated in Table 1.

Example 7

<Fabrication of Sheet for Forming Process 7, Evaluation Thereof>

A sheet for forming process 7 is fabricated in accordance with the same manner as that of example 1 except that a polyarylate sheet containing bisphenol AP (PAR(AP); manufactured by UNITIKA.LTD., thickness: 200 μm) is employed in place of the polyarylate sheet containing bisphenol A used in example 4.

In the sheet for forming process 7, each surface resistivity is $3.4\times10^{11}$ Ω/□ in a surface of the functional layer, while $4.1\times10^{10}$ Ω/□ in a surface of the image reception layer. The sheet for forming process 7 is cut into A-4 size, the same evaluations as those of example 1 are made on these test samples, and the results obtained are collectively indicated in Table 1.

Example 8

<Fabrication of Sheet for Forming Process 8, Evaluation Thereof>

A sheet for forming process 8 is fabricated in accordance with the same manner as that of example 1 except that an alloy product of polycarbonate containing bisphenol A (PC(A); 25% by weight) and polyarylate containing bisphenol A (PAR; 75% by weight) (manufactured by UNITIKA.LTD., thickness: 200 μm) is employed in place of the polycarbonate sheet containing bisphenol A used in example 1.

In the sheet for forming process 8, each surface resistivity is $1.55\times10^{11}$ Ω/□ in a surface of the functional layer, while $3.2\times10^{10}$ Ω/□ in a surface of the image reception layer. The sheet for forming process 8 is cut into A-4 size, the same evaluations as those of example 1 are made on these test samples, and the results obtained are collectively indicated in Table 1.

Comparative Example 1

<Fabrication of Sheet for Forming Process 9, Evaluation Thereof>

A sheet for forming process 9 is fabricated in accordance with the same manner as that of example 1 except that an A-PET sheet (manufactured by Teijin Chemicals Ltd., thickness: 200 μm) is employed as a base material in place of the polycarbonate sheet used in example 1.

In the sheet for forming process 9, each surface resistivity is $5.7\times10^{11}$ Ω/□ in a surface of the functional layer, while $3.0\times10^{11}$ Ω/□ in a surface of the image reception layer. The sheet for forming process 9 is cut into A-4 size, the same evaluations as those of example 1 are made on these test samples. The sheet turns into slightly whitening and haze develops. The results obtained are collectively indicated in Table 1.

Comparative Example 2

<Fabrication of Sheet for Forming Process 10, Evaluation Thereof>

A sheet for forming process 10 is fabricated in accordance with the same manner as that of example 1 except that an ABS resin sheet (STYLAC A3921; manufactured by Asahi Kasei Chemicals Corporation, thickness: 200 μm) is employed as a base material in place of the polycarbonate sheet used in example 1.

In the sheet for forming process 10, each surface resistivity is $6.7\times10^{10}$ Ω/□ in a surface of the functional layer, while $1.0\times10^{11}$ Ω/□ in a surface of the image reception layer. The sheet for forming process 10 is cut into A-4 size, the same evaluations as those of example 1 are made on these test samples. As a result, although the sheet for forming process 10 on which an image is fixed is obtained, the resulting sheet has an insufficient stiffness, so that all the sheet samples become a waved condition after passing through a fixing device of a color copying machine. The results obtained are collectively indicated in Table 1.

Comparative Example 3

<Fabrication of Sheet for Forming Process 11, Evaluation Thereof>

A biaxially oriented PET sheet (trade name: LUMIRROR 150×53; manufactured by Toray Industries Inc.; thickness: 150 μm) having 150 μm thickness into which an antistatic agent is kneaded is employed as a base material. The sheet is cut into A-4 size as it is without applying any coating solution on both surfaces of the base material, whereby samples of a sheet for forming process 11 are fabricated.

A surface resistivity of the sheet for forming process 11 composed of only a base material is $1.8\times10^{10}$ Ω/□. Then, the sheet for forming process 11 was evaluated as in example 1. As a result, traveling performance, fixability, and resistance to light are poor. The results obtained are collectively indicated in Table 1.

Example 9

<Preparation of Functional Layer Coating Solution A-2>

Ten parts of a silicone resin (trade name: SI COAT801, manufactured by GE Toshiba Silicones Corporation; solid content: 30% by weight) as a thermosetting resin, 0.3 part of polydimethyl siloxane fine particles (trade name: TP145, manufactured by GE Toshiba Silicones Corporation; average particle diameter: 4.5 μm) as a filler, 0.2 part of a surfactant (trade name: PIONIN B144V, manufactured by Takemoto Oil and Fat Co., Ltd.), 0.3 part of 2-(2-hydroxy-5-methylphenyl)-2H-benzotriazole (trade name: SUMISORB 200, manufactured by Sumitomo Chemical Co., Ltd.) as an ultraviolet absorber, and 0.03 part of a silver-supported calcium phosphate-base inorganic antimicrobial agent (trade name: APASIDER AW, manufactured by Sangi Co., Ltd.) as an antimicrobial agent are added to 30 parts of a liquid mixed in 10/90 weight ratio of cyclohexanone/methyl ethyl ketone, the mixture is sufficiently agitated to prepare a functional layer coating solution A-2 for controlling releasability, antimicrobial activity, surface resistivity and resistance to light.

<Preparation of Image Reception Layer Coating Solution B-2>

Ten parts of a polyester resin (trade name: FOLLET FF-4, manufactured by Soken Chemical and Engineering Co., Ltd.; solid content: 30% by weight), 0.05 part of crosslinkage type methacrylic ester copolymer fine particles (trade name: MX-1000, manufactured by Soken Chemical and Engineering Co., Ltd.; volume average particle diameter: 10 μm), as a matting agent (double as a filler), 0.5 part of 2-(2-hydroxy-5-methylphenyl)-2H-benzotriazole (trade name: SUMISORB 200, manufactured by Sumitomo Chemical Co., Ltd.) as an ultraviolet absorber, and 0.1 part of an antioxidant (trade name: CHELEX-500, manufacture by Sakai Chemical Industry Co., Ltd.), and further 0.2 part of a surfactant (trade name: ELEGAN 264WAX, manufactured by NOF Corporation) are added to a mixed solvent composed of 10 parts of toluene and 30 parts of methyl ethyl ketone, and the mixture is sufficiently agitated to prepare an image reception layer coating solution B-2.

<Fabrication of Sheet for Forming Process 12, Evaluation Thereof>

The above-described functional layer coating solution A-2 is applied to either side of a base material being a polycarbonate sheet containing bisphenol A (trade name: IUPILON S-2000, manufactured by Mitsubishi Engineering-Plastics Corporation; thickness: 200 μm) by the use of a wire bar, and dried at 90° C. for one minute to form a functional layer of 2 μm film thickness for controlling releasability, antimicrobial activity, surface resistivity and resistance to light.

Furthermore, the above-described image reception layer coating solution B-2 is similarly applied to an uncoated surface opposite to that on which the functional layer coating solution A-2 is applied in the base material, and dried at 90° C. for one minute to form an image reception layer (coated layer) of 1.5 μm film thickness, whereby a sheet for forming process 12 is fabricated. In the sheet for forming process 12, each surface resistivity is $3.0\times10^{12}$ Ω/□ in a surface of the functional layer, while $3.7\times10^{11}$ Ω/□ in a surface of the image reception layer. Then, the sheet for forming process 12 is cut into A-4 size to be served for test sample.

As to evaluation of the sheet for forming process 12, a reflected image is printed out on a surface of the image reception layer (the surface opposite to the functional layer), and the same evaluation as that of example 1 is made. The results obtained are collectively indicated in Table 1.

On one hand, antimicrobial activity is evaluated with respect to *Escherichia coli* and *Staphylococcus aureus* in accordance with a film contact method of Society of Industrial-Technology for Antimicrobial Articles. The results obtained are collectively indicated in Table 2. As is apparent from Table 2, a viable cell number after 24 hours exhibits a very small value, whereby it is found that sufficient antibacterial effects are achieved.

Example 10

<Fabrication of Sheet for Forming Process 13, Evaluation Thereof>

A sheet for forming process 13 is fabricated in accordance with the same manner as that of example 1 except that a polyarylate sheet containing bisphenol A (PAR (A); trade name: U POLYMER, manufactured by UNITIKA.LTD., thickness: 200 μm) is employed in place of the polycarbonate sheet containing bisphenol A used in example 9.

In the sheet for forming process 13, each surface resistivity is $7.6\times10^{10}$ Ω/□ in a surface of the functional layer, while $9.80\times10^{10}$ Ω/□ in a surface of the image reception layer. The sheet for forming process 13 is cut into A-4 size, the same evaluations as those of example 9 are made on these test samples, and the results obtained are collectively indicated in Table 1.

On one hand, antimicrobial activity is evaluated with respect to *Escherichia coli* and *Staphylococcus aureus* in accordance with a film contact method of Society of Industrial-Technology for Antimicrobial Articles. The results obtained are collectively indicated in Table 2. As is apparent from Table 2, a viable cell number after 24 hours exhibits a very small value, whereby it is found that sufficient antibacterial effects are achieved.

Example 11

<Preparation of Image Reception Layer Coating Solution B-3>

Twenty five parts of a polyester resin (trade name: THERMOLAC F-1, manufactured by Soken Chemical and Engineering Co., Ltd.; 30% by weight solid content), 0.1 part of crosslinkage type methacrylic ester copolymer fine particles (trade name: MX-1000, manufactured by Soken Chemical and Engineering Co., Ltd.; volume average particle diameter: 10 μm) as a matting agent (double as a filler), 0.6 part of a surfactant (trade name: ELEGAN 264WAX, manufactured by NOF Corporation), and 0.04 part of a silver-supported zirconium phosphate-base inorganic antibacterial agent (trade name: NOVARON AG300, manufactured by Toagosei Co., Ltd.) are added to a mixed solvent composed of 30 parts of toluene and 90 parts of methyl ethyl ketone, and agitated sufficiently to prepare an image reception layer coating solution B-3.

<Fabrication of Sheet for Forming Process 14, Evaluation Thereof>

The image reception layer coating solution B-3 is applied to both surfaces of a base material being the polyarylate sheet used in example 4 by the use of a wire bar, and dried at 90° C. for one minute to form an image reception layer of 2 μm film thickness, whereby a sheet for forming process 14 is fabricated. In the sheet for forming process 14, a surface resistivity is $7.8\times10^{9}$ Ω/□. Then, the sheet for forming process 12 is cut into A-4 size to be served for test samples.

As to evaluation of the sheet for forming process 14, a reflected image is printed out on either surface of the image reception layer, and the same evaluation as that of example 1 is made. The results obtained are collectively indicated in Table 1.

On one hand, antimicrobial activity is evaluated with respect to *Escherichia coli* and *Staphylococcus aureus* in accordance with a film contact method of Society of Industrial-Technology for Antimicrobial Articles as in example 12. The results obtained are collectively indicated in Table 2. As is apparent from Table 2, a viable cell number after 24 hours exhibits a very small value, whereby it is found that sufficient antibacterial effects are achieved.

Comparative Example 4

The image reception layer coating solution B-3 used in example 14 is applied to both surfaces of a base material being a biaxially oriented PET sheet (trade name: LUMIRROR 188T60; manufactured by Toray Industries Inc.; thickness: 188 μm) by the use of a wire bar, and dried at 90° C. for one minute to form an image reception layer of 2.0 μm film thickness, whereby a sheet for forming process 15 is fabricated. In the sheet for forming process 15, a surface resistivity is $1.7\times10^{9}$ Ω/□. Then, the sheet for forming process 15 is cut into A-4 size to be served for test samples.

As to evaluation of the sheet for forming process 15, a reflected image is printed out on either surface of the image reception layer, and the same evaluation as that of example 1 is made. The results obtained are collectively indicated in Table 1.

Formation-Processability

A thermosetting white ink (trade name: FOM-611, manufactured by Teikoku Printing Inks Mfg. Co., Ltd.) is applied on an image surface of the sheet for forming process 14, on which surface a reflected image is formed, and dried at 60° C. for 30 minutes to provide a protection layer having 50 μm thickness, whereby a sheet for forming process with the protection layer 14A is fabricated.

The sheet for forming process with the protection layer 14A is heated to 220° C. by means of a heater, vacuum forming is carried out by the use of a predetermined mold, and at the same time, a polyester resin is poured into concave areas on a surface of the sheet, whereby the forming processed product 14A is fabricated. The resulting forming processed product 14A exhibits a configuration according exactly to that of the mold. When observed from a side opposite to that on which the protection layer is formed, there is no appearance of discoloration, crease and the like on the forming processed product, whereby it is found that the image formed on the image reception layer is excellent in visual recognition.

On the other hand, the sheet for forming process 15 fabricated in comparative example 4 is used in place of the sheet for forming process 14, and a forming processed product 15A is prepared in accordance with the same manner as that described above. However, a sufficient elongation according exactly to the configuration of the mold is not obtained thereby to partly produce creases in the forming processed product 15A, so that a planiform product is obtained.

TABLE 1

| | Functional Layer | Image Reception Layer | Sheet | Evaluation Item: Traveling Performance | Fixability | Image Concentration | Image Quality | Resistance to Light |
|---|---|---|---|---|---|---|---|---|
| Example 1 | A-1 | B-1 | PC(A) | A | A | A | A | A |
| Example 2 | A-1 | B-1 | PC(Z) | A | A | A | A | A |
| Example 3 | A-1 | B-1 | PC(AP) | A | A | A | A | A |
| Example 4 | A-1 | B-1 | PAR(A) | A | A | A | A | A |
| Example 5 | A-1 | B-1 | PAR/PET/PAR | A | A | A | A | A |
| Example 6 | A-1 | B-1 | PAR(Z) | A | A | A | A | A |
| Example 7 | A-1 | B-1 | PAR(AP) | A | A | A | A | A |
| Example 8 | A-1 | B-1 | PC(A)-PAR | A | A | A | A | A |
| Comparative Example 1 | A-1 | B-1 | A-PET | A | A | B | P-C | C |
| Comparative Example 2 | A-1 | B-1 | ABS | C | — | — | — | — |
| Comparative Example 3 | None | None | PET | C | C | B | R-C | D |
| Example 9 | A-2 | B-2 | PC(A) | A | A | A | A | A |
| Example 10 | A-2 | B-2 | PAR(A) | A | A | A | A | A |
| Example 11 | B-3 | B-3 | PAR(A) | A | A | A | A | A |
| Comparative Example 4 | B-3 | B-3 | PET | A | C | B | R-C | D |

—: Since a test sample cannot be traveled, an evaluation is impossible.

TABLE 2

| | *Escherichia Coli* | | | *Staphylococcus Aureus* | | |
|---|---|---|---|---|---|---|
| Name of Test Bacteria | Test Piece | Number of Bacteria Added Initially | Viable Cell Number (after 24 hours) | Test Piece | Number of Bacteria Added Initially | Viable Cell Number (after 24 hours) |
| Example 9 | Example 9 | $2.5 \times 10^5$ | <10 | Example 9 | $5.0 \times 10^5$ | <10 |
| | Blank | | $4.5 \times 10^5$ | Blank | | $6.8 \times 10^6$ |
| | Control Plot | | $4.9 \times 10^5$ | Control Plot | | $4.6 \times 10^5$ |
| Example 10 | Example 10 | $2.4 \times 10^5$ | <10 | Example 10 | $3.9 \times 10^5$ | <10 |
| | Blank | | $2.6 \times 10^6$ | Blank | | $9.8 \times 10^5$ |
| | Control Plot | | $4.9 \times 10^5$ | Control Plot | | $7.2 \times 10^5$ |
| Example 11 | Example 11 | $2.8 \times 10^5$ | <10 | Example 11 | $4.2 \times 10^5$ | <10 |
| | Blank | | $2.1 \times 10^6$ | Blank | | $1.4 \times 10^6$ |
| | Control Plot | | $1.1 \times 10^6$ | Control Plot | | $3.7 \times 10^6$ |

As is apparent from Table 1, the sheet for forming processs according to the invention have excellent traveling performance, sufficient fixability, an image concentration of a certain level or higher, and resistance to light.

What is claimed is:

1. A sheet for a product forming process, comprising:

a base material including a layer made of at least one selected from polycarbonate resins and polyarylate resins;

at least one functional layer containing a resin provided on a surface of the base material so as to be in contact with the layer made of at least one selected from polycarbonate resins and polyarylate resins, the at least one functional layer having, at a surface thereof opposite to the surface in contact with the layer, a surface resistivity of $1.0\times10^8$ to $1.0\times10^{13}$ Ω/□, wherein the surface of the layer and a surface of the at least one functional layer in contact with each other are fused together, and wherein the sheet further comprises a toner image formed on a surface thereof and a protection layer formed on the toner image for protecting the toner image.

2. The sheet for the product forming process according to claim 1, wherein:

the base material contains at least two layers; and at least one layer of the base material contains a polyester resin prepared by copolymerizing at least ethylene glycol, terephthalic acid, and 1,4-cyclohexanedimethanol.

3. The sheet for the product forming process according to claim 1, wherein the at least one functional layer is an image receiving layer containing at least a resin and a filler.

4. The sheet for the product forming process according to claim 3, wherein the resin contained in the image receiving layer is a polyester resin.

5. The sheet for the product forming process according to claim 3, wherein:

another functional layer is provided on a side of the base material that is opposite from the surface on which the image receiving layer is formed; and the another functional layer has at least one function selected from those for controlling glossiness, resistance to light, antimicrobial activity, flame retardancy, releasability, and chargeability.

6. The sheet for the product forming process according to claim 1, wherein the at least one functional layer contains at least one selected from charge control agents, antimicrobial agents, ultraviolet absorbers, and antioxidants.

7. The sheet for the product forming process according to claim 1, wherein the base material is transparent.

8. The sheet for the product forming process according to claim 1, wherein the base material is formed from a nonchlorine-based resin.

9. The sheet for the product forming process according to claim 1, wherein the toner image is formed on the surface of the at least one functional layer opposite to the surface in contact with the layer, and is formed by means of an electrophotographic method.

10. The sheet for the product forming process according to claim 9, wherein the toner image is formed as a reflected image.

11. The sheet for the product forming process according to claim 9, wherein the protection layer is white.

12. The sheet for the product forming process according to claim 1, wherein the sheet is subjected to the product forming process after the image has been formed.

13. The sheet for the product forming process according to claim 1, wherein the toner image is formed by means of an electrophotographic method, the toner image being formed on a surface of the base material that is opposite from the side on which the at least one functional layer is formed.

14. The sheet for the product forming process according to claim 13, wherein an image receiving layer is formed between the base material and the toner image.

15. The sheet for the product forming process according to claim 13, wherein the toner image is formed as a reflected image.

16. The sheet for the product forming process according to claim 13, wherein the protection layer is white.

17. A method for manufacturing a sheet for a product forming process including a base material including a layer made of at least one selected from polycarbonate resins and polyarylate resins and at least one functional layer containing a resin provided on a surface of the base material so as to be in contact with the layer made of at least one selected from polycarbonate resins and polyarylate resins, the at least one functional layer having, at a surface thereof opposite to the surface in contact with the layer, a surface resistivity of $1.0\times10^{8}$ to $1.0\times10^{13}$ Ω/□,the method comprising:

forming the at least one functional layer on the surface of the base material by using a coating solution;

wherein a solvent used for the coating solution is a good solvent for at least one selected from polycarbonate resins and polyarylate resins; and wherein the surface of the layer and a surface of the at least one functional layer in contact with each other are fused together; and forming a toner image on a surface of the sheet and forming a protection layer on the toner image for protecting the toner image.

18. A method for forming an image comprising forming a toner image by means of an electrophotographic method on a surface of a functional layer in a sheet for a product forming process, and forming a protection layer on the toner image for protecting the toner image, the sheet including a base material including a layer made of at least one selected from polycarbonate resins and polyarylate resins, at least one functional layer provided on a surface of the base material so as to be in contact with the layer made of at least one selected from polycarbonate resins and polyarylate resins, wherein the at least one functional layer contains a resin and having, at a surface thereof opposite to the surface in contact with the layer, a surface resistivity of $1.0\times10^{8}$ to $1.0\times10^{13}$ Ω/□, and wherein the surface of the layer and a surface of the at least one functional layer in contact with each other are fused together.

19. A method for manufacturing a forming processed product, comprising:

forming a toner image by means of an electrophotographic method on a surface of at least one functional layer in a sheet for a product forming process including a base material including a layer made of at least one selected from polycarbonate resins and polyarylate resins, the at least one functional layer provided on a surface of the base material so as to be in contact with the layer made of at least one selected from polycarbonate resins and polyarylate resins, the at least one functional layer having, at a surface thereof opposite to the surface in contact with the layer, a surface resistivity of $1.0\times10^{8}$ to $1.0\times10^{13}$ Ω/□, and wherein the surface of the layer and a surface of the at least one functional layer in contact with each other are fused together;

providing a protection layer on the sheet for the product forming process so as to cover the toner image; and processing the sheet for the product forming process on which the protection layer is provided.

20. The method for manufacturing a forming processed product according to claim 19, wherein the toner image comprises a picture, a pattern or design, a character, or a combination thereof.

21. The method for manufacturing a forming processed product according to claim 19, wherein the processing is applied by means of a sheet forming method.

22. The method for manufacturing a forming processed product according to claim 19, further comprising filling concave regions of the processed sheet for the product forming process with a filler.

23. A forming processed product, comprising:

a sheet for a product forming process including a base material including a layer made of at least one selected from polycarbonate resins and polyarylate resins, at least one functional layer provided on a surface of the base material so as to be in contact with the layer made of at least one selected from polycarbonate resins and polyarylate resins, the at least one functional layer having, at a surface thereof opposite to the surface in contact with the layer, a surface resistivity of $1.0\times10^{8}$ to $1.0\times10^{13}$ Ω/□, and wherein the surface of the layer and the surface of the at least one functional layer in contact with each other are fused together, and a toner image being formed by means of an electrophotographic method on a surface of the at least one functional layer;

and a protection layer for covering the toner image.

24. The forming processed product according to claim 23, wherein the processed sheet for the product forming process contains concave areas, and the concave areas are filled with a filler.

* * * * *